United States Patent
Glasgow et al.

(10) Patent No.: US 11,853,944 B2
(45) Date of Patent: Dec. 26, 2023

(54) MANAGED INVENTORY

(71) Applicant: eBay Inc., San Jose, CA (US)

(72) Inventors: Dane Glasgow, Los Altos, CA (US); Steve Yankovich, San Jose, CA (US); Marc Peter Hosein, Saratoga, CA (US); Shweta Pogde, Sunnyvale, CA (US); Snigdha Mokkapati, Sunnyvale, CA (US); Gokulkrishna B. Pillai, San Jose, CA (US); Sri Harsha Chevuru, San Jose, CA (US); Dinesh Kumar Damodharan, Santa Clara, CA (US); Chethan Narayan, San Jose, CA (US); Vinay Rajashekar Nagar, San Jose, CA (US); Suraj Chhetri, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/328,206

(22) Filed: May 24, 2021

(65) Prior Publication Data

US 2021/0279665 A1 Sep. 9, 2021

Related U.S. Application Data

(63) Continuation of application No. 14/569,188, filed on Dec. 12, 2014, now Pat. No. 11,107,023.
(Continued)

(51) Int. Cl.
*G06Q 10/0631* (2023.01)
*G06Q 10/0875* (2023.01)

(52) U.S. Cl.
CPC ... *G06Q 10/06315* (2013.01); *G06Q 10/0875* (2013.01)

(58) Field of Classification Search
CPC ............ G06Q 10/06315; G06Q 10/0875
(Continued)

(56) References Cited

U.S. PATENT DOCUMENTS

| 4,052,882 A | 10/1977 | Wittkowski |
| 4,799,169 A | 1/1989 | Mims |

(Continued)

FOREIGN PATENT DOCUMENTS

| AU | 2014364486 B2 | 5/2017 |
| CA | 2929957 A1 | 5/2015 |

(Continued)

OTHER PUBLICATIONS

Shu-Jen Wang "The simulated impact of RFID-enabled supply chain on pull-based inventory replenishment in TFT-LCD industry", Department of Industrial Engineering and Management, National Chin-Yi University of Technology, Taiwan, ROC; accepted 12 De (Year: 2007).*

(Continued)

*Primary Examiner* — Abdallah A El-Hage Hassan
(74) *Attorney, Agent, or Firm* — SCHWEGMAN LUNDBERG & WOESSNER, P.A.

(57) ABSTRACT

Example methods and systems are directed to a managed inventory. A database may store information regarding items owned by a user. The information regarding an item may include a quantity owned and one or more triggering events. Based on the occurrence of a triggering event, an order for the item may be placed without user intervention. Data to the database may be provided by one or more sensors. Triggering events may be defined in terms of sensor data. The triggering event may be defined by a user or through machine learning. The order may be placed using a prede-
(Continued)

termined modality or a dynamically-determined modality based on one or more criteria, such as price, shipping speed, and the urgency of the order.

14 Claims, 18 Drawing Sheets

Related U.S. Application Data

(60) Provisional application No. 61/919,204, filed on Dec. 20, 2013.

(58) Field of Classification Search
USPC .................................................. 705/7.25
See application file for complete search history.

(56) References Cited

U.S. PATENT DOCUMENTS

| | | | |
|---|---|---|---|
| 4,846,701 A | 7/1989 | Hayes et al. | |
| 4,947,028 A | 8/1990 | Gorog | |
| 5,168,445 A | 12/1992 | Kawashima et al. | |
| 5,568,539 A | 10/1996 | Bergsman et al. | |
| 5,642,197 A | 6/1997 | Tuhro et al. | |
| 5,723,283 A | 3/1998 | Classen | |
| 5,952,832 A | 9/1999 | Stevanovic et al. | |
| 6,341,271 B1* | 1/2002 | Salvo | G06Q 10/087 705/28 |
| 6,362,573 B1 | 3/2002 | Helbing et al. | |
| 6,420,139 B1 | 7/2002 | Classen | |
| 6,638,739 B2 | 10/2003 | Classen | |
| 6,751,525 B1 | 6/2004 | Crisp, III | |
| 6,853,291 B1 | 2/2005 | Aisa | |
| 7,010,502 B1 | 3/2006 | Hoshizawa et al. | |
| 7,130,814 B1 | 10/2006 | Szabo et al. | |
| 7,426,490 B1 | 9/2008 | Borsand et al. | |
| 7,729,951 B2* | 6/2010 | Dawson | G06Q 30/0603 705/27.2 |
| 8,498,888 B1 | 7/2013 | Raff et al. | |
| 8,924,262 B2 | 12/2014 | Shuster | |
| 9,306,828 B2* | 4/2016 | Fahimi | G06F 11/3058 |
| 9,324,042 B2* | 4/2016 | Agarwal | G06Q 30/0641 |
| 9,449,208 B2 | 9/2016 | Luk et al. | |
| 9,829,887 B2* | 11/2017 | Zhu | B25J 11/008 |
| 10,430,858 B1* | 10/2019 | Glasgow | G06Q 30/0631 |
| 10,508,968 B1* | 12/2019 | Vaganay | G01N 17/04 |
| 10,593,199 B1* | 3/2020 | Slusar | G08G 1/0112 |
| 11,030,571 B2 | 6/2021 | Glasgow et al. | |
| 11,107,023 B2 | 8/2021 | Glasgow et al. | |
| 11,556,971 B2 | 1/2023 | Glasgow et al. | |
| 2001/0014868 A1 | 8/2001 | Herz et al. | |
| 2001/0014898 A1 | 8/2001 | Terakado et al. | |
| 2001/0017023 A1 | 8/2001 | Armington et al. | |
| 2002/0091592 A1 | 7/2002 | Sugiura et al. | |
| 2002/0161652 A1* | 10/2002 | Paullin | G06K 17/00 705/22 |
| 2002/0178066 A1* | 11/2002 | Roh | G06Q 20/203 705/22 |
| 2003/0019165 A1 | 1/2003 | Gallant et al. | |
| 2003/0139176 A1 | 7/2003 | Fujiwara et al. | |
| 2003/0172072 A1 | 9/2003 | Smith | |
| 2003/0189429 A1 | 10/2003 | Belenger et al. | |
| 2004/0034581 A1* | 2/2004 | Hill | G06Q 10/087 705/28 |
| 2004/0130331 A1 | 7/2004 | Frederick et al. | |
| 2005/0060242 A1 | 3/2005 | Armstrong et al. | |
| 2005/0075954 A1* | 4/2005 | Matsumoto | G06Q 10/087 705/28 |
| 2005/0187744 A1 | 8/2005 | Morrison et al. | |
| 2006/0053075 A1* | 3/2006 | Roth | G06Q 10/06 705/50 |
| 2006/0155595 A1 | 7/2006 | Johannsen | |
| 2007/0013489 A1 | 1/2007 | Bechtle et al. | |
| 2008/0025734 A1 | 1/2008 | Kehoe et al. | |
| 2008/0291015 A1 | 11/2008 | Charles | |
| 2009/0030749 A1 | 1/2009 | Drummond et al. | |
| 2009/0204512 A1 | 8/2009 | Connell et al. | |
| 2009/0212927 A1* | 8/2009 | Flick | B60R 25/1004 340/425.5 |
| 2010/0106626 A1 | 4/2010 | Ashrafzadeh et al. | |
| 2011/0099507 A1 | 4/2011 | Nesladek et al. | |
| 2012/0022965 A1* | 1/2012 | Seergy | G06Q 30/0639 705/26.4 |
| 2012/0154169 A1 | 6/2012 | Hoekstra | |
| 2012/0271645 A1 | 10/2012 | Dain et al. | |
| 2013/0117053 A2 | 5/2013 | Campbell | |
| 2013/0201018 A1 | 8/2013 | Horstemeyer et al. | |
| 2013/0332207 A1 | 12/2013 | Brunel et al. | |
| 2014/0006131 A1 | 1/2014 | Causey et al. | |
| 2014/0084060 A1 | 3/2014 | Jain et al. | |
| 2014/0089088 A1 | 3/2014 | Umeda | |
| 2014/0203915 A1 | 7/2014 | Puleston et al. | |
| 2014/0207619 A1 | 7/2014 | Ishebabi | |
| 2014/0278735 A1 | 9/2014 | Gettings et al. | |
| 2014/0297487 A1 | 10/2014 | Bashkin | |
| 2015/0149298 A1* | 5/2015 | Tapley | G06Q 30/0633 705/14.66 |
| 2015/0178654 A1 | 6/2015 | Glasgow et al. | |
| 2015/0185751 A1 | 7/2015 | Karc | |
| 2015/0302510 A1 | 10/2015 | Godsey et al. | |
| 2015/0338281 A1 | 11/2015 | Ross et al. | |
| 2016/0132821 A1* | 5/2016 | Glasgow | G06Q 10/087 705/28 |
| 2019/0064800 A1* | 2/2019 | Frazzoli | G06V 20/597 |
| 2019/0064801 A1* | 2/2019 | Frazzoli | G05D 1/0088 |
| 2019/0064802 A1* | 2/2019 | Frazzoli | G05D 1/0061 |
| 2019/0064803 A1* | 2/2019 | Frazzoli | B60W 50/14 |
| 2019/0064804 A1* | 2/2019 | Frazzoli | B60W 60/0011 |
| 2019/0064805 A1* | 2/2019 | Frazzoli | G05D 1/0246 |
| 2019/0087769 A9 | 3/2019 | Glasgow et al. | |
| 2020/0034912 A1 | 1/2020 | Glasgow et al. | |
| 2021/0016781 A1* | 1/2021 | Karunai-Ramanujam | B60W 40/08 |
| 2021/0248549 A1 | 8/2021 | Glasgow et al. | |
| 2023/0075002 A1 | 3/2023 | Glasgow et al. | |

FOREIGN PATENT DOCUMENTS

| | | |
|---|---|---|
| CN | 101067860 A | 11/2007 |
| CN | 102905113 A | 1/2013 |
| CN | 105981059 A | 9/2016 |
| JP | 2003-185327 A | 7/2003 |
| KR | 2000-0063201 A | 11/2000 |
| KR | 2003-0015411 A | 2/2003 |
| KR | 10-2009-0003488 A | 1/2009 |
| WO | 2015/077637 A1 | 5/2015 |
| WO | 2015/095493 A1 | 6/2015 |

OTHER PUBLICATIONS

Loo Hay Lee • Chulung Lee • Jie Bao, "The Impacts of an Electronic Marketplace with Multiple Independent Retailers for Smart Grocery Ordering Systems", Published online: Apr. 9, 2011 © Springer Science+Business Media, LLC (Year: 2011).*

Chin-Tsai Lin a, Chie-Bein Chen b, Ying-Chan Ting a, "An ERP model for supplier selection in electronics industry", Expert Systems with Applications (Year: 2011).*

Notice of Allowance received for U.S. Appl. No. 14/569,188, dated Apr. 21, 2021, 16 pages.

Non-Final Office Action received for U.S. Appl. No. 14/569,188, dated May 6, 2019, 31 pages.

Fernandes Louella, "Internet of Things: A New Era for Smart Printing?", https://www.louellafernandes.com/2014/04/22/internet-things-new-era-smart-print, Apr. 22, 2014, 3 pages.

Advisory Action received for U.S. Appl. No. 14/569,188, dated Dec. 4, 2017, 3 Pages.

Advisory Action Received for U.S. Appl. No. 14/569,188, dated Oct. 19, 2020, 3 pages.

Final Office Action received for U.S. Appl. No. 14/569,188, dated Sep. 8, 2017, 22 Pages.

(56) References Cited

OTHER PUBLICATIONS

Final Office Action received for U.S. Appl. No. 14/569,188, dated Aug. 15, 2018, 28 pages.
Final Office Action Received for U.S. Appl. No. 14/569,188, dated Sep. 26, 2019, 32 Pages.
Final Office Action Received for U.S. Appl. No. 14/569,188, dated Jul. 15, 2020, 38 Pages.
Non Final Office Action Received for U.S. Appl. No. 14/569,188, dated Jan. 27, 2020, 34 pages.
Non-Final Office Action received for U.S. Appl. No. 14/569,188, dated Dec. 19, 2018, 30 pages.
Non-Final Office Action received for U.S. Appl. No. 14/569,188, dated Mar. 20, 2018, 26 pages.
Non-Final Office Action received for U.S. Appl. No. 14/569,188, dated May 16, 2017, 17 pages.
U.S. Appl. No. 14/538,696 U.S. Pat. No. 11,030,571, filed Nov. 11, 2014, Managed Inventory.
U.S. Appl. No. 17/241,137, filed Apr. 27, 2021, Managed Inventory.
U.S. Appl. No. 14/569,188, filed Dec. 12, 2014, Managed Inventory.
U.S. Appl. No. 14/588,320 U.S. Pat. No. 10,430,858, filed Dec. 31, 2014, E-Commerce Replacement or Replenishment of Consumable.
U.S. Appl. No. 16/590,362, filed Oct. 1, 2019, E-Commerce Replacement or Replenishment of Consumable.
Notice of Acceptance received for Australian Patent Application No. 2014364486, dated May 13, 2017, 3 pages.
Humphries,"Panasonic Introduces Auto-Adjusting Energy-Saving Lighting", Geek Newsletter, Geek.com, https://www.geek.com/gadgets/panasonic-introduces-auto-adjusting-energy-saving-lighting-683101/, Feb. 2, 2009, 3 pages.
Trial Board Decision received for Korean Patent Application No. 2016-7019607, mailed on Oct. 11, 2019, 23 Pages (13 Pages of English translation and 10 Pages of Official Copy).
Final Office Action Received for Korean Patent Application No. 10-2016-7019607 dated Feb. 27, 2018, 5 pages.
Final Office Action received for Korean Patent Application No. 10-2018-7020143, dated Apr. 20, 2021, 6 Pages (3 pages of English Translation and 3 pages of Official Copy).
Office Action Received for Korean Patent Application No. 10-2018-7020143, dated Mar. 3, 2020, 11 pages (6 pages of Official Copy and 5 pages of English Translation).
Office Action Received for Korean Patent Application No. 10-2018-7020143, dated Oct. 23, 2020, 10 pages (5 pages of Official copy and 5 pages of English Translation).
Appeal Decision Received for U.S. Appl. No. 14/538,696, mailed on Jul. 17, 2020, 15 Pages.
Corrected Notice of Allowability Received for U.S. Appl. No. 14/538,696, dated Apr. 27, 2021, 2 pages.
Decision on Pre Appeal Brief received for U.S. Appl. No. 14/538,696, mailed on Jul. 19, 2018, 2 pages.
Examiner's Answer to Appeal Brief received for U.S. Appl. No. 14/538,696, mailed on Dec. 27, 2018, 13 pages.
Final Office Action received for U.S. Appl. No. 14/538,696, dated Apr. 6, 2018, 15 pages.
Final Office Action received for U.S. Appl. No. 14/538,696, dated May 15, 2017, 29 pages.
First Action Interview—Office Action Summary received for U.S. Appl. No. 14/538,696, dated Dec. 21, 2016, 6 pages.
First Action Interview—Pre-interview Communication received for U.S. Appl. No. 14/538,696, dated Sep. 21, 2016, 5 pages.
Non-Final Office Action received for U.S. Appl. No. 14/538,696, dated Oct. 30, 2017, 30 Pages.
Non-Final Office Action Received for U.S. Appl. No. 14/538,696, dated Sep. 24, 2020, 23 pages.
Notice of Allowance Received for U.S. Appl. No. 14/538,696, dated Feb. 1, 2021, 9 Pages.
Third Examination Report received for Australian Patent Application No. 2019204416, dated Dec. 9, 2020, 5 Pages.
Gannon, "Hydraulics & Pneumatics63.8: vol. 46, Issue 5", Penton Media, Inc., Penton Business Media, Inc. and their subsidiaries, Aug. 2010, 4 pages.

Lee et al., "The Impacts of an Electronic Marketplace with Multiple Independent Retailers for Smart Grocery Ordering Systems", Wireless Personal Communications, vol. 60, 2011, pp. 475-487.
Lin et al., "An ERP Model for Supplier Selection in Electronics Industry", Expert Systems with Applications, vol. 38, 2011, pp. 1760-1765.
International Preliminary Report on Patentability received for PCT Application No. PCT/US2014/071103, dated Jun. 30, 2016, 9 pages.
International Search Report received for PCT Patent Application No. PCT/US2014/071103, dated May 21, 2015, 4 pages.
Written Opinion received for PCT Patent Application No. PCT/US2014/071103, dated May 21, 2015, 7 pages.
Wang et al., "The Simulated Impact of RFID-enabled Supply Chain on Pull-based Inventory Replenishment in TFT-LCD Industry", Department of Industrial Engineering and Management, International Journal of Production Economics, vol. 112, No. 2, 2006, pp. 570-586.
Advisory Action received for U.S. Appl. No. 14/588,320, dated Jun. 7, 2018, 6 pages.
Final Office Action received for U.S. Appl. No. 14/588,320, dated Dec. 17, 2018, 34 pages.
Final Office Action received for U.S. Appl. No. 14/588,320, dated Mar. 2, 2018, 27 pages.
Non-Final Office Action received for U.S. Appl. No. 14/588,320, dated Aug. 30, 2017, 22 pages.
Non-Final Office Action received for U.S. Appl. No. 14/588,320, dated Aug. 7, 2018, 42 pages.
Notice of Allowance received for U.S. Appl. No. 14/588,320, dated Jun. 5, 2019, 16 pages.
Office Action received for Canadian Patent Application No. 2,934,326, dated Apr. 5, 2018, 5 pages.
Office Action received for Canadian Patent Application No. 2,934,326, dated May 1, 2017, 5 pages.
First Examiner Report received for Australian Patent Application No. 2014364486, dated Dec. 23, 2016, 5 pages.
Decision of Rejection Received for Chinese Patent Application No. 201480075184.6, dated Nov. 5, 2019, 7 pages.
Office Action received for Chinese patent Application No. 201480075184.6, dated Jan. 2, 2019, 18 pages (9 pages of Official Copy and 9 pages of English Translation).
Office Action received for Chinese patent Application No. 201480075184.6, dated Jul. 25, 2019, 20 pages (12 pages of English Translation and 8 pages of Official Copy).
Final Office Action received for Korean Patent Application No. 2016-7019607, dated May 15, 2018, 7 pages (3 pages of English Translation and 4 pages of Official Copy).
Office Action received for Korean Patent Application No. 2016-7019607, dated Aug. 23, 2017, 10 Pages (5 pages of Official Copy and 5 pages of English Translation).
Office Action received for Korean Patent Application No. 2016-7019607, dated Feb. 24, 2017, 8 pages (4 pages of Official Copy and 4 pages of English Translation).
First Examination Report received for Australian Patent Application No. 2017219097, dated Jun. 24, 2018, 3 pages.
Second Examination Report Received for Australian Patent No. 2017219097 dated Jan. 15, 2019, 4 pages.
First Examination report Received for Australian Patent Application No. 2019204416, dated Apr. 1, 2020, 3 pages.
Fourth Office Action received for Australian Patent Application No. 2019204416, dated Mar. 26, 2021, 5 Pages.
Second Examination Report Received for Australian Patent Application No. 2019204416, dated Sep. 30, 2020, 5 pages.
2019204416,"Third Examination Report received for Australian Patent Application No. 2019204416, dated Dec. 9, 2020", Dec. 9, 2020, 5 Pages.
Reexamination Notification received for Chinese Patent Application No. 201480075184.6 dated Jul. 15, 2021, 13 Pages (With Machine Translation).
"Korean Application Serial No. 10-2021-7033544, Notice of Preliminary Rejection dated Jan. 4, 2022", w English translation, 13 pgs.

(56) References Cited

OTHER PUBLICATIONS

"U.S. Appl. No. 16/590,362, Non Final Office Action dated Mar. 10, 2022", 12 pgs.

Hsu, C F, "Smart Pantries for Homes", IEEE International Conference on Systems, Man, and Cybernetics vol. 5, (2006), 4276-4283.

"ETRI develops 'USN Middleware V 2' with Improved Sensor Network Usability", Electronic Newspaper (etnews.com), Retrieved from the Internet URL: <https://www.etnews.com/200810010024>, Oct. 1, 2008, 1 page.

"Ubiquitous Sensor Network (USN) Technology Trend", cic0182's blog, Information and Communication, Retrieved from the Internet URL: <https://blog.naver.com/cic0182/100027167067>, Aug. 7, 2006, 5 pages.

Big Data, Naver Blog, Retrieved from the Internet URL: <https://blog.naver.com/lottoeshop/40168807062>, Sep. 24, 2012, 4 pages.

Samsung Networks Commercializes Next-generation Wireless Communication Solution, Mobile news/communication News (realtime), Retrieved from the Internet URL: <https://blog.daum.net/adam5235/11805822>, Jun. 20, 2007, 2 pages.

Final Office Action received for Korean Patent Application No. 10-2018-7020143 dated Jul. 16, 2021, 8 pages (4 pages of English translation and 4 pages of official copy).

Final Office Action received for U.S. Appl. No. 16/590,362, dated Aug. 20, 2021, 31 pages.

Webster, "Definition: Electromechanical", Retrieved from the Internet URL: <https://web.archive.org/web/20090425173005/https://www.merriam-webster.com/dictionary/electromechanical (Year: 2009), Apr. 25, 2009, 1 page.

Corrected Notice of Allowability Received for U.S. Appl. No. 14/538,696, dated May 6, 2021, 2 pages.

Non Final Office Action Received for U.S. Appl. No. 16/590,362, dated May 10, 2021, 36 pages.

"U.S. Appl. No. 16/590,362, Examiner Interview Summary dated Jun. 3, 2022", 2 pgs.

"Korean Application Serial No. 10-2021-7033544, Final Office Action dated Jun. 24, 2022", w English translation, 6 pgs.

"U.S. Appl. No. 16/590,362, Notice of Allowance dated Aug. 17, 2022", 9 pgs.

"U.S. Appl. No. 16/590,362, Supplemental Notice of Allowability dated Oct. 3, 2022", 3 pgs.

"U.S. Appl. No. 17/241,137, Non Final Office Action dated Oct. 5, 2022", 16 pgs.

"Korean Application Serial No. 10-2021-7033544, Response Filed Sep. 27, 2022 to Notice of Preliminary Rejection dated Jan. 4, 2022", W English Claims, 22 pgs.

U.S. Appl. No. 18/055,469, filed Nov. 15, 2022, Method, Non-Transitory Computer-Readable Media, and System for E-Commerce Replacement or Replenishment of Consumable.

"U.S. Appl. No. 17/241,137, Examiner Interview Summary dated Apr. 7, 2023", 3 pgs.

"U.S. Appl. No. 17/241,137, Response filed Apr. 10, 2023 to Final Office Action dated Feb. 9, 2023", 10 pgs.

"U.S. Appl. No. 17/241,137, Examiner Interview Summary dated Dec. 5, 2022", 2 pgs.

"U.S. Appl. No. 16/590,362, Supplemental Notice of Allowability dated Dec. 15, 2022", 2 pgs.

"U.S. Appl. No. 17/241,137, Final Office Action dated Feb. 9, 2023", 20 pgs.

"U.S. Appl. No. 17/241,137, Notice of Allowance dated May 15, 2023", 19 pgs.

"U.S. Appl. No. 18/055,469, Non Final Office Action dated Jun. 1, 2023", 16 pgs.

"U.S. Appl. No. 18/055,469, Examiner Interview Summary dated Aug. 8, 2023", 2 pgs.

"U.S. Appl. No. 17/241,137, Notice of Allowance dated Sep. 1, 2023", 10 pgs.

"U.S. Appl. No. 17/241,137, Corrected Notice of Allowability dated Sep. 20, 2023", 2 pgs.

"U.S. Appl. No. 18/055,469, Final Office Action dated Oct. 24, 2023", 16 pgs.

\* cited by examiner

1100

1110 — Sensor

| Sensor ID | Type | Label | Location | Value |
|---|---|---|---|---|

1120 — Condition

| Condition ID | Timestamp | Sensor or Item ID | Value | Type | Duration |
|---|---|---|---|---|---|

1130 — User

| User ID | Payment Account | Address | Preferences |
|---|---|---|---|

1140 — Item

| Item ID | Name | Description |
|---|---|---|

1150 — Inventory

| User ID | Item ID | Quantity | Sensor ID |
|---|---|---|---|

1160 — Conditional Action

| Action ID | Condition ID | Item ID | Quantity | User ID | Status |
|---|---|---|---|---|---|

1170 — Action Preferences

| Action ID | Price Weight | Time Weight | Source Weight |
|---|---|---|---|

1180 — Supplier

| Supplier ID | Item ID | Price | Date |
|---|---|---|---|

1190 — Supplier Preferences

| User ID | Supplier ID | Rank |
|---|---|---|

*FIG. 11*

MANAGED INVENTORY

CROSS-REFERENCE TO RELATED APPLICATIONS

This application is a continuation of U.S. application Ser. No. 14/569,188, filed Dec. 12, 2014, which claims the benefit of U.S. Provisional Application No. 61/919,204, filed Dec. 20, 2013, each of which is incorporated herein by reference in its entirety.

TECHNICAL FIELD

The subject matter disclosed herein generally relates to the use of sensor data to control automated systems. Specifically, the present disclosure addresses systems and methods related to a sensor-driven managed inventory.

BACKGROUND

An electronic marketplace provides the ability for users to buy and sell items electronically. A user may determine when stock of a particular item is running low or is depleted entirely and may place an order to restock the item. For example, an end user that consumes an item may reorder the item when it runs out. As another example, a retailer that sells an item may place an order for the item when inventory runs low, to keep enough of the item on hand to satisfy demand.

Additional electronic marketplaces may provide the ability for users to buy and sell the same items electronically. A user may review the items available on the multiple electronic marketplaces and choose which electronic marketplace to order from. For example, two marketplaces may offer the same item, but the user may prefer one over the other because it offers the item at a lower price.

BRIEF DESCRIPTION OF THE DRAWINGS

Some embodiments are illustrated, by way of example and not limitation, in the figures of the accompanying drawings.

FIGS. 11-12 are block diagrams illustrating a database schema suitable for a managed inventory, according to some example embodiments.

DETAILED DESCRIPTION

Figure 1:
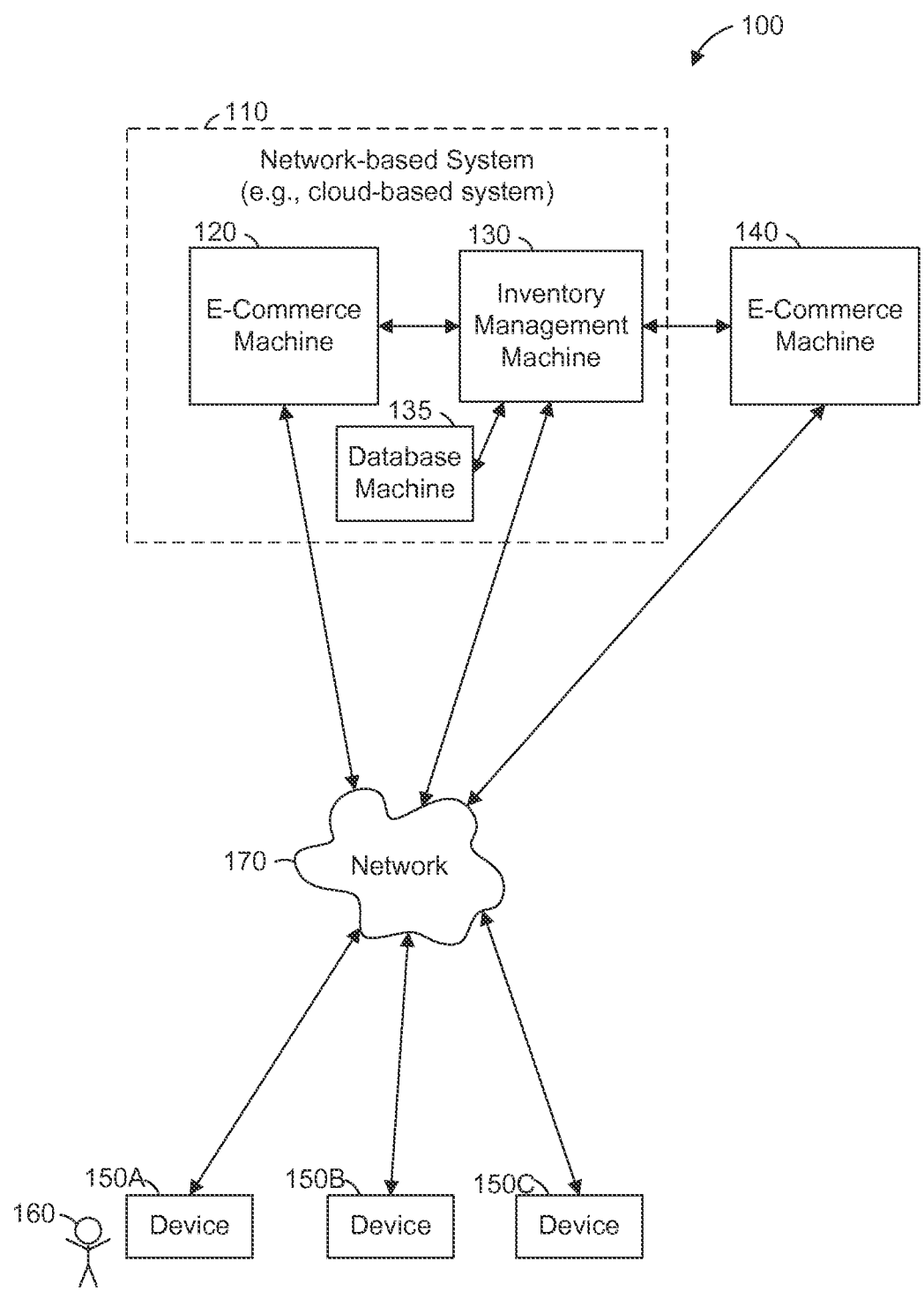
FIG. 1 is a network diagram illustrating a network environment suitable for a managed inventory, according to some example embodiments.

Example methods and systems are directed to a managed inventory. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A database may store information regarding items owned by a user. An item is a physical or electronic product that can be bought or sold. For example, books, cars, guitars, and other tangible or intangible goods are all items. The information regarding an item may include a quantity owned and one or more triggering events. Based on the occurrence of a triggering event, an order for the item can be placed without user intervention.

Data is provided to the database by one or more sensors. A sensor is a device capable of detecting information. For example, sensors may detect the ambient temperature, the date of the year, the time of the day, the number of times particular appliances are used, and so on. The identification of items in the inventory and the quantity owned may be input by a user or automatically determined through the use of the sensors. The sensors may transmit detected information to one or more computing devices via Bluetooth, Bluetooth low energy, wireless networking, wired connections, or in other ways.

Triggering events are defined in terms of sensor data. For example, a user may need firewood in the winter, but not in summer. A weight sensor (e.g., a scale) may detect the current weight of wood stored by the user, while a time sensor (e.g., a clock) working with a temperature sensor (e.g., a thermometer) can determine the season. Based on the weight of the wood being below a threshold and the season being winter, an order for delivery of wood may be placed. The determination that the season is winter may be based on the current date (e.g., between December 1 and March 1), based on the temperature (e.g., a high temperature below 60 degrees Fahrenheit for at least five consecutive days), or a suitable combination thereof. The amount of wood to be ordered may be a fixed, predetermined amount, or may be based on sensor data. For example, if the time sensor and temperature sensor indicate that winter is nearly over, the amount of wood ordered may less than if the time sensor and temperature sensor indicate that winter is just beginning. As another example, if the weight sensor indicates that the wood stockpile is nearly depleted, more wood may be ordered than if the weight sensor indicates that the wood stockpile is barely below the threshold for placing an order.

The order may be placed from a predetermined electronic commerce site. Alternatively, the source of the items ordered may be dynamically determined based on one or more criteria. Example criteria include price, shipping speed, and urgency of the order. Additionally, orders placed on an electronic commerce site may be placed using different shopping modalities. For example, fixed-price shopping or auction shopping may be used. The order may be placed using a predetermined modality or a dynamically-determined modality based on one or more criteria, such as price, shipping speed, and the urgency of the order.

A user can also enter an order into a user interface and have the source or modality automatically determined based on one or more criteria. For example, the user may specify an item, a quantity of the item, and a delivery date. Based on availability of the item from various electronic commerce sites in various shopping modalities, one or more orders may be placed that result in the lowest total cost while meeting the user's other criteria. As another example, the user may specify one or more sellers on the one or more electronic commerce sites that the user prefers to do business with. The sellers may be ranked by the user or the electronic commerce sites. Based on the ranking, priority may be given to certain sellers over others.

FIG. 1 is a network diagram illustrating a network environment 100 suitable for a managed inventory, according to some example embodiments. The network environment 100 includes e-commerce machines 120 and 140, an inventory management machine 130, a database machine 135, and devices 150A, 150B, and 150C, all communicatively coupled to each other via a network 170. The devices 150A, 150B, and 150C may be collectively referred to as "devices 150," or generically referred to as a "device 150." The e-commerce machines 120 and 140, the database machine 135, and the inventory management machine 130 may be part of a network-based system 110. Alternatively, the devices 150 may connect to the inventory management machine 130 directly or over a local network distinct from the network 170 used to connect to the e-commerce machine 120 or 140. The e-commerce machines 120 and 140, the inventory management machine 130, and the devices 150 may each be implemented in a computer system, in whole or in part, as described below with respect to FIG. 18.

The e-commerce machines 120 and 140 provide an electronic commerce application to other machines (e.g., the user devices 150 or the inventory management machine 130) via the network 170. The e-commerce machines 120 and 140 may also be connected directly to, or integrated with, the inventory management machine 130. In some example embodiments, one e-commerce machine 120 and the inventory management machine 130 are part of a network-based system 110, while other e-commerce machines (e.g., the e-commerce machine 140) are separate from the network-based system 110. The electronic commerce application may provide a way for users to buy and sell items directly to each other, to buy from and sell to the electronic commerce application provider, or both.

The inventory management machine 130 may provide data to other machines (e.g., the e-commerce machines 120 and 140 or the devices 150) via the network 170 or another network. The inventory management machine 130 may receive data from other machines (e.g., the e-commerce machines 120 and 140 or the devices 150) via the network 170 or another network.

The database machine 135 stores data about items. For example, a database in the inventory management machine 130 may have tables storing information regarding wood, paper, food, and electronic subscriptions. These tables may indicate not only static information about the items that does not change such as a name and an image, but also dynamic information that changes over time such as a current inventory and a rate of use. The inventory management machine 130 also stores data about users. For example, the inventory management machine 130 may have tables indicating which of these items is owned by a particular user. In a home, multiple users of the inventory management machine 130 may each have ownership of different items. To illustrate, one roommate may consume one brand of soda (e.g., Brand X) while another roommate consumes a different brand of soda (e.g., Brand Y). An image sensor (e.g., a camera) in the refrigerator, coupled to a processor configured to analyze images and identify the number of cans of each type of soda, can determine when the quantity of Brand X or Brand Y soda falls below a predetermined threshold. Based on an association of the soda with the corresponding roommate, an order for the soda can be placed and the appropriate roommate billed. The functions of the database machine 135 may be implemented by the inventory management machine 130 or by a separate physical device.

Also shown in FIG. 1 is a user 160. The user 160 may be a human user (e.g., a human being), a machine user (e.g., a computer configured by a software program to interact with the devices 150 and the inventory management machine 130), or any suitable combination thereof (e.g., a human assisted by a machine or a machine supervised by a human). The user 160 is not part of the network environment 100, but is associated with the devices 150 and may be a user of the devices 150. For example, the device 150 may be a sensor, a desktop computer, a vehicle computer, a tablet computer, a navigational device, a portable media device, or a smart phone belonging to the user 160.

In some example embodiments, the inventory management machine 130 is on a local or private network owned or controlled by the user 160. The inventory management machine 130 can be protected by a firewall or otherwise isolated from public networks, such as the Internet. This arrangement may serve to protect information about the user 160 gathered by the inventory management machine 130 and reduce the risk of use of private data by others.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 18. As used herein, a "database"

is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 170 may be any network that enables communication between or among machines, databases, and devices (e.g., the inventory management machine 130 and the devices 150). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
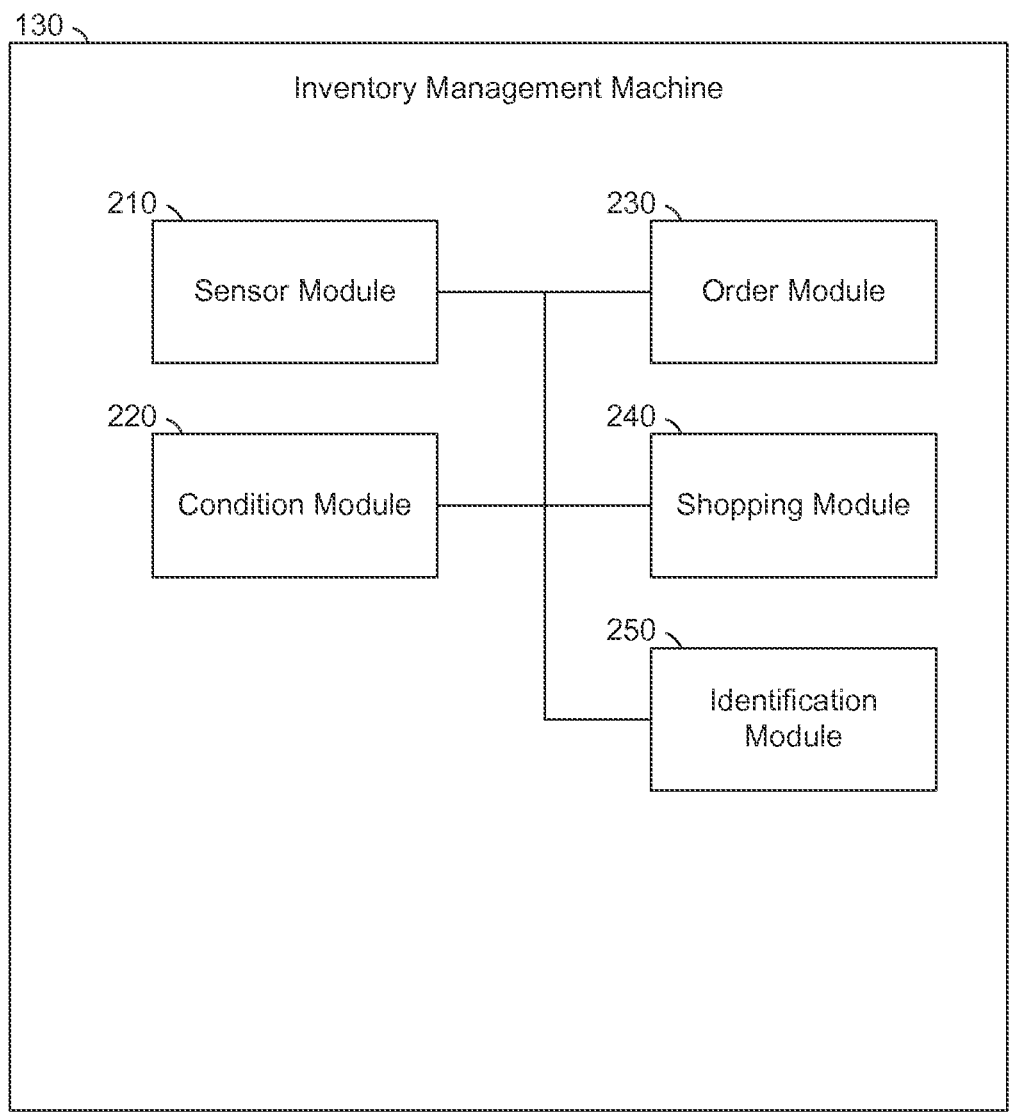
FIG. 2 is a block diagram illustrating components of an inventory management machine suitable for a managed inventory, according to some example embodiments.

FIG. 2 is a block diagram illustrating components of the inventory management machine 130, according to some example embodiments. The inventory management machine 130 is shown as including a sensor module 210, a condition module 220, an order module 230, a shopping module 240, and an identification module 250, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The sensor module 210 is configured to receive and process sensor data. For example, a temperature may be received from a thermometer, a weight may be received from a scale, or an image may be received from a camera. To illustrate, a camera may take a picture and send it to the sensor module 210. The sensor module 210 may process the sensor data to determine a quantity of an item in the user's inventory. For example, an image may be processed to count individual depicted items or to estimate a volume occupied by the item and calculate a quantity of the item based on the estimated volume. To illustrate, a number of cans of soda may be counted or the size of a stack of paper estimated from the image and used to calculate a number of pages of paper in the inventory. As another example example, a pressure sensor in a shelf can detect the weight and footprint of an item. Accordingly, a full container of milk can be distinguished from a nearly empty one by the weight difference.

The condition module 220 is configured to access and store conditional actions. The conditional actions are the actions that will be taken under certain conditions, along with those conditions. Conditions and actions stored by the condition module 220 may be received through a user interface (UI). In one example embodiment, the user enters the precise conditions to be met for each item in order to trigger the action of placing an order. This may be done through the use of UI components such as text fields, drop-down menus, date selectors, and the like.

The order module 230 may be configured to determine when conditions stored by the condition module 220 are met and to execute the corresponding action by placing an order for items. For example, the condition module 220 may access a condition indicating that when the number of eggs in the refrigerator falls below 3, a dozen eggs should be ordered. The order module 230 may receive data from the sensor module 210 indicating that 2 eggs are present in the user's inventory and, by comparing the number of eggs present to the threshold indicated in the condition, conclude that the condition accessed by the condition module 220 has been met. In response, the order module 230 communicates with the e-commerce machine 120 to place an order. For example, the order module 230 may send the user's address and credit card information along with the quantity of the item to be ordered. The e-commerce machine 120 may cause the user's account to be charged for the ordered items and communicate the order to the appropriate parties (e.g., the warehouse storing the physical items ordered).

The shopping module 240, if present, is configured to determine which source among multiple available sources should be used to place the order. Thus, in some example embodiments, the order module 230 is configured to place an order with an e-commerce machine 120 as described above. In other example embodiments, the order module 230 determines how many items are needed (e.g., one dozen eggs) and informs the shopping module 240 of the order. In turn, the shopping module 240 determines how to source the order and places one or more resulting orders with e-commerce machines 120 and 140. The order module 230 may provide additional information to the shopping module 240 regarding the order. For example, the order module 230 may indicate a desired delivery date or a desired brand.

The identification module 250, if present, is configured to identify items based on sensor data. In some example embodiments, the sensor module 210 identifies quantities of items already in the user's inventory and the identification module 250 identifies items not already known to be in the user's inventory. For example, data from multiple sensors can be combined to generate information about different attributes of an item. An item database can be searched based on the multiple known attributes to identify an item that is a closest match based on the received sensor data. For example, image data may be used to identify items via machine-vision algorithms. The image data can be combined with other data to improve the accuracy of the identification. Similarly, a grey Styrofoam brick can be distinguished from a concrete block based on weight. In some example embodiments, an identification module 250 is not needed because particular sensors are dedicated to particular items or because automatic identification of new items is not supported.

Additionally or alternatively, the shopping module 240 may be configured to receive orders from a user without the intermediation of the order module 230. For example, a user may use a user interface to enter a desired quantity of an item. Responsive to the user input, the shopping module 240 may place one or more orders with e-commerce machines 120 and 140 to cause the desired quantity of the item to be delivered to the user. After receiving the order from the user or from the order module 230, the shopping module 240 may consider one or more user-defined criteria in determining which sources to place resulting orders with.

Figure 3:
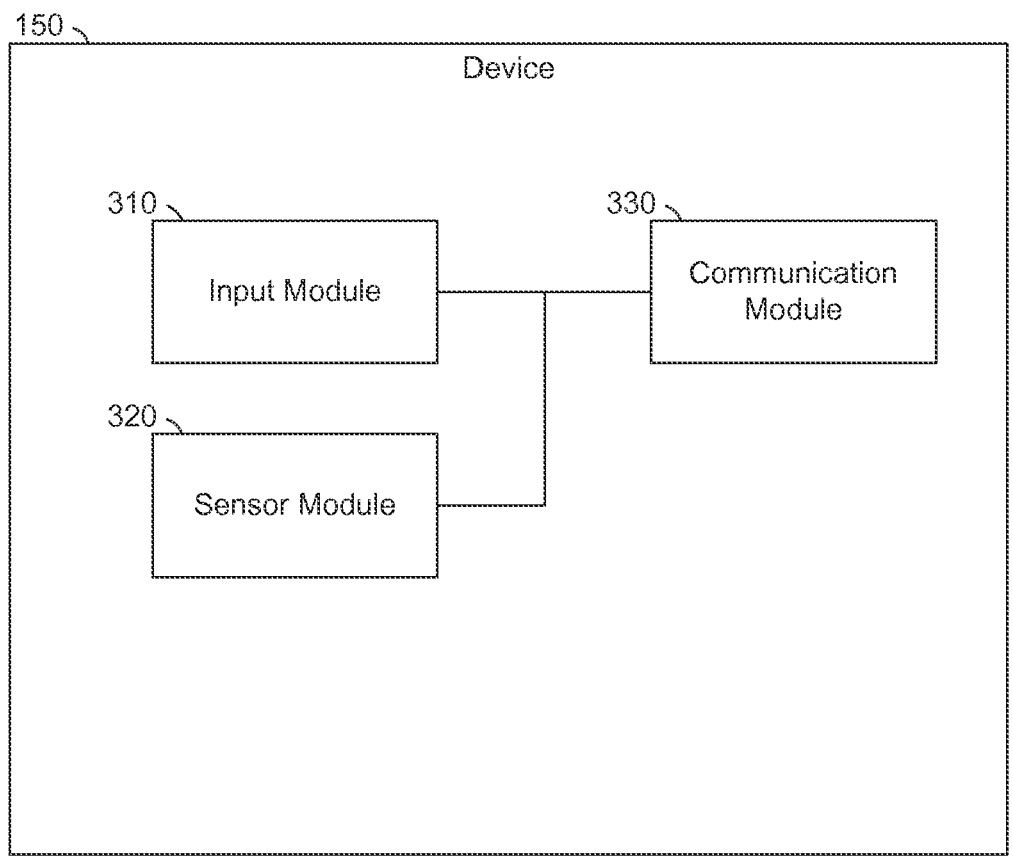
FIG. 3 is a block diagram illustrating components of a device suitable for a managed inventory, according to some example embodiments.

FIG. 3 is a block diagram illustrating components of the device 150, according to some example embodiments. The device 150 is shown as including an input module 310, a sensor module 320, and a communication module 330, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input module 310 is configured to receive input from a user via a user interface. For example, the user may enter a current quantity of an item in the user's inventory, a quantity below which the item should be ordered, a quantity of the item to order when reordering, and the sensor to use to detect the current quantity of the item or when an item of the user's inventory is used.

The available sensors may be organized in a hierarchy for presentation to the user. The hierarchy may be based on the type of the sensor or the physical location of the sensor. For example, in a home, cupboards in the kitchen and garage may have scales built into them while each room may have a security camera. Accordingly, a user may be presented first with a selection of rooms and then with a selection of sensors in the room or first with a selection of sensor types and then with a selection of individual sensors. As another example, an office may have multiple photocopy machines, each of which has sensors for detecting the use of paper and toner. Accordingly, a user may be presented first with a selection of machines and then with a selection of sensors in the selected machine, or first presented with a type of sensor and then with a selection of a particular machine. Sensors may also be aggregated. For example, if the user is tracking the available paper in an office, the initial quantity of paper may be entered and the paper consumption sensors of all photocopiers and fax machines selected.

The sensor module 320 is configured to receive sensor data. For example, a temperature may be received from a thermometer, a weight may be received from a scale, or an image may be received from a camera. The sensor module 320 may process the sensor data to determine a quantity of an item in the user's inventory. For example, an image may be processed to count individual depicted items or to estimate a volume occupied by the item. To illustrate, a number of cans of soda may be counted or the size of a stack of paper estimated from the image and used to calculate a number of pages of paper in the inventory. The sensor module 320 may also process the sensor data to determine a change in the quantity of an item in the user's inventory. For example, a count of pages consumed by a photocopier may be used to determine the decrease in number of pages available, which may then be used to determine the current number of pages available.

The communication module 330 is configured to communicate data received by the input module 310 or the sensor module 320 to the inventory management machine 130. For example, the input module 310 may receive input containing the amount of an item owned by a user and the communication module 330 may transmit the quantity to the inventory management machine 130 to be stored in a database accessible by the condition module 220. As another example, the sensor module 320 may receive a temperature from a thermometer and the communication module 330 may transmit the temperature to the inventory management machine 130 for processing by the sensor module 210.

Figure 4:
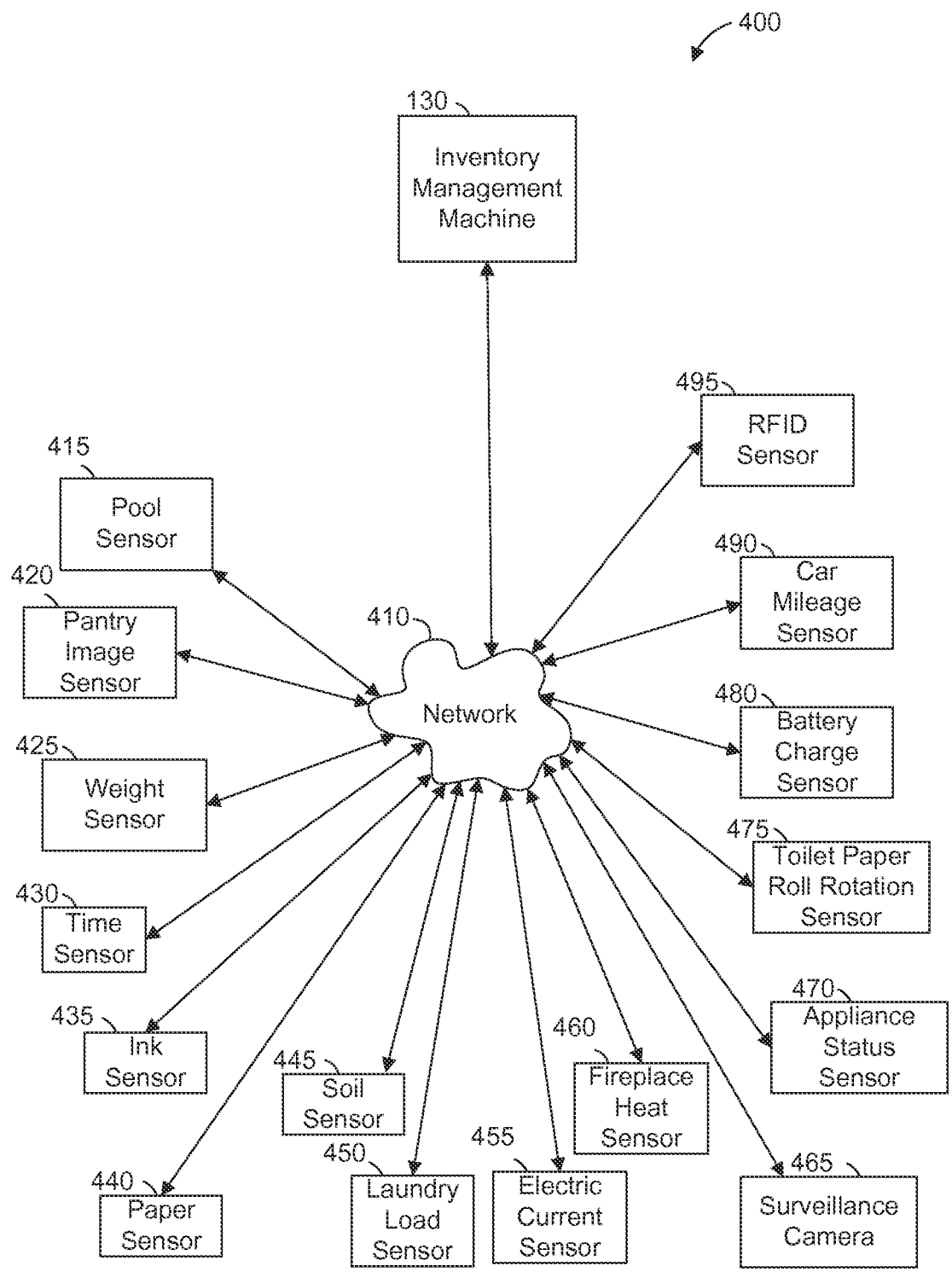
FIG. 4 is a network diagram illustrating a network environment suitable for a managed inventory, according to some example embodiments.

FIG. 4 is a network diagram illustrating a network environment suitable for a managed inventory, according to some example embodiments. The network environment 400 includes an inventory management machine 130, and sensors 415, 420, 425, 430, 435, 440, 445, 450, 455, 460, 465, 470, 475, 480, 490 and 495, all communicatively coupled to each other via a network 410. The network 410 may be a local area network (LAN), a wide-area network (WAN), the Internet, or another network. The inventory management machine 130 and the sensors 415-495 may each be implemented in a computer system, in whole or in part, as described below with respect to FIG. 18.

In an example embodiment, a pool sensor 415 (e.g., a sensor that measures the water quality of the pool) monitors a swimming pool. By comparing a measure of an attribute of the pool to predetermined range values (handled by the condition module 220), the order module 230 of the management machine 130 can determine if the attribute is outside of the predetermined range. Based on a determination that the attribute is outside of the allowed range, an alert may be generated, maintenance requested, or both. For example, the chlorine level of the pool may fall below the desired threshold and additional chlorine may need to be added. As another example, the clarity of the water may fall below the desired threshold and pool cleaning may be needed.

In an example embodiment, a sensor (e.g., a scale) in a pantry measures the weight of items on a shelf, while a pantry image sensor 420 determines the identity of the items (e.g., a camera in conjunction with image-recognition software). Based on the sensor inputs, the amount of items remaining is determined. When the amount of each item remaining falls below a threshold (e.g., one can of chicken noodle soup or one box of instant mashed potatoes), additional items are ordered by the order module 230.

In an example embodiment, a weight sensor 425 (e.g., a scale) in a refrigerator measures the weight of items on a shelf, while a second sensor determines the identity of the items (e.g., a camera in conjunction with image-recognition software). Based on the sensor inputs, the amount of milk remaining is determined. When the amount of milk remaining falls below a threshold (e.g., one quart), additional milk is ordered by the order module 230.

In another example embodiment, the weight sensor 425 sits below a propane tank in an outdoor grill. Based on the change in weight of the propane, as reported by the weight sensor 425, the inventory management machine 130 determines the consumption of propane and generates an alert or places an order for another tank of propane.

In another example embodiment, the weight sensor 425 is a switch sensor that reports the presence or absence of an item, but not the weight. For example, egg cups in a refrigerator may have switch sensors in the bottom that detect when an object is present. Based on the specialized nature of the egg cup, the inventory management machine 130 can determine that one egg is present for each depressed switch.

In another example embodiment, a time sensor 430 (e.g., a clock) measures the elapse of time. For example, a filter for a central air conditioning unit may have a life span of two months. Based on the elapse of time from the time of installation of the filter, an additional filter may be ordered by the order module 230. As another example, the oil in a car may be changed every three months. Based on the elapse of time from the last oil change, a maintenance appointment may be scheduled by the order module 230.

In one example embodiment, an ink sensor 435 in a printer measures the amount of ink remaining (e.g., a number of milliliters of ink or a number of pages remaining). A threshold amount of ink is set (e.g., 5 mL or 50 pages). When the measured amount of ink falls below the threshold, new ink cartridges are ordered by the order module 230.

In one example embodiment, paper sensor 440 in a printer measures the amount of paper remaining. For example, an infrared emitter and sensor embedded above the paper tray can measure the distance from the top of the stack of paper to the sensor. Based on a known distance from the sensor to the base of the tray and a known thickness of paper, the number of pages of paper in the tray can be calculated. When the measured amount of paper falls below the threshold, additional paper is ordered by the order module 230.

In another example embodiment, soil sensor 445 is placed in soil and measures one or more properties of the soil (e.g., moisture, alkalinity, and so on). For example, based on a level of moisture falling below a threshold, the order module 230 can activate an automatic watering system. As another example, a high alkaline level in the soil may trigger a request for a gardener to add fertilizer to the soil In another example embodiment, a laundry load sensor 450 in a washing machine measures the number of loads of laundry done. Based on the number of loads of laundry done, an average amount of laundry detergent used per load, and a starting amount of detergent, the amount of detergent remaining is determined. When the amount of detergent remaining falls below a threshold (e.g., detergent for five loads of laundry remaining), additional laundry detergent is ordered by the order module 230.

In yet another example embodiment, an electric current sensor 455 in a lamp determines when a bulb has died and when it has been replaced. Based on an initial number of bulbs remaining and the determination that a bulb has been replaced, the number of bulbs remaining is determined. When the number of bulbs remaining falls below a threshold (e.g., one replacement bulb), additional bulbs are ordered by the order module 230. Multiple lamps using the same type of bulb may contribute to the determination of the remaining number of bulbs.

In another example embodiment, a fireplace heat sensor 460 in a fireplace measures the total number of British thermal units (BTUs) generated by burning wood. Based on the BTUs generated, an average BTU generated per log, and a starting number of logs, the number of logs remaining is determined. When the number of logs remaining falls below a threshold (e.g., ten logs), additional logs are ordered by the order module 230.

In still another example embodiment, a surveillance camera 465 monitors activity within the scope of the field of vision of the surveillance camera 465. Multiple surveillance cameras 465 may be used to increase the total area of coverage. The surveillance camera 465 may be a still or video camera, operating in the optical or infrared range, or another type of camera. Based on visual data gathered by the surveillance camera 465, determinations regarding item usage can be made. Facial or object identification algorithms can be used to identify items and people seen by the camera. For example, the inventory table 1150 (discussed below with respect to FIG. 11) may have a record indicating that 12 eggs are in the refrigerator. A surveillance camera 465 located in a kitchen may observe the breaking of 3 eggs. Accordingly, the record indicating the quantity of eggs available can be updated, to show that only 9 eggs remain. As another example, the inventory table 1150 may have a record indicating that 20 uses of toothpaste for one person remain and that 15 uses of a different brand of toothpaste for a different person remain. A surveillance camera 465 located in a bathroom may observe that a person is brushing their teeth, and update the quantity of toothpaste remaining for that person.

The surveillance camera 465 can also be used to detect the breaking of items that are not expected to be broken. For example, analysis of images captured by the surveillance camera 465 may reveal that a light bulb that was dropped shattered upon hitting the ground. Based on the determination that the light bulb is broken, the quantity of available light bulbs can be decremented.

The surveillance camera 465 may also be used to observe the activities of pets and other animals. For example, a cat's usage of a litter box can be observed. Each time the litter box is used, a count of remaining uses can be decremented by the inventory management machine 130. When the count reaches zero, the user 160 may be prompted to change the litter box. Similarly, the changing of the litter box can be detected by the surveillance camera 465, causing the sensor module 210 to decrement the amount of litter remaining and to reset the number of remaining uses for the current box.

The surveillance camera 465 may be placed in a garage. For example, in a garage, images or video from the surveillance camera 465 may be used by the sensor module 210 to determine the depth of tire tread remaining in the tires of a car. Based on the tire tread falling below a predetermined depth (e.g., ⅛ of an inch), an alert may be generated indicating that the tires need to be replaced, an appointment made at an auto shop, or both. Similarly, images or video from the surveillance camera 465 may be used by the sensor module 210 to determine that the windshield of the car is smeared with water or dirt instead of being clean. Based on the detection of the smearing, the order module 230 may generate an alert indicating that the windshield wipers need to be replaced, schedule an appointment at an auto shop, or both.

The surveillance camera 465 may be placed in a yard. For example, in a yard, images or video from the surveillance camera 465 may be used by the sensor module 210 to determine the health of plants. Based on the plants becoming unhealthy, an alert may be generated, an appointment made with a gardener, or both. Similarly, an image of the yard can be compared with an image of the ideal landscape to determine when the growth of plants has deviated too far from the ideal. Based on the deviation, an alert may be generated, an appointment made with a gardener, or both.

In another example embodiment, an appliance status sensor 470 in a smart appliance reports error codes generated by the appliance. Based on the reported error code, the order module 230 provides an alert to the user, sends a repair request to a repair or maintenance provider, or both.

In yet another example embodiment, a toilet paper roll rotation sensor 475 in a bathroom measures the number of rotations of a toilet paper dispenser. Based on the number of rotations of the dispenser, an average number of rotations per toilet paper roll, and a starting number of toilet paper rolls, the number of toilet paper rolls remaining is determined. When the number of toilet paper rolls falls below a threshold (e.g., three rolls of toilet paper), the order module 230 orders additional toilet.

In another example embodiment, a battery charge sensor 480 (e.g., an electrical current sensor or a voltage sensor) in a battery-powered device (e.g., a smoke alarm, a toy, a flashlight, or a remote control) determines when the batteries in that device have died, and when they have been replaced. The sensor or the device may also identify the number and type of batteries replaced. Based on an initial number of batteries remaining and the sensor data regarding the replacement of batteries, the number of batteries remaining is determined. When the number of batteries remaining falls below a threshold (e.g., two batteries), the order module 230 orders additional batteries. Multiple battery-powered devices using the same type of battery may contribute to the determination of the remaining number of batteries.

In another example embodiment, a car mileage sensor 490 (e.g., an odometer) in a car measures the number of miles driven by the car. Based on the sensor data and the recorded number of miles driven when the oil was last changed, the number of miles driven since the last oil change can be determined. When the number of miles driven exceeds a threshold defined in the condition module 220 (e.g., 5000 miles), an oil change is scheduled by the order module 230. When the number of miles driven exceeds another threshold (e.g., 30,000 miles), an appointment to change the tires is scheduled. Another sensor (e.g., a voltmeter) in the car measures the strength of the battery. Based on the strength of the battery falling below a threshold (e.g., 11.5V), an appointment to change the battery is scheduled.

In yet another example embodiment, a radio-frequency identification (RFID) sensor 495 with a detecting antenna in a storage area (e.g., a cupboard, a refrigerator, a pantry, or a supply closet) determines when an RFID tag leaves the storage area (e.g., moves beyond the range of the RFID sensor). By working in conjunction with a weight sensor, the weight of the removed tagged item can be determined. The RFID sensor 495 can determine when the item is returned. Again working in conjunction with the weight sensor, the weight of the returned item can be determined. If the weight at the time of removal is not the same as the weight at the time of return, an amount of the item added or removed can be determined, and used to update the inventory. For example, milk weighs approximately eight ounces per cup. Accordingly, if a half-gallon carton of milk is removed and returned eight ounces lighter, the sensor module 210 can reduce the user's inventory of milk by one cup.

Figure 5:
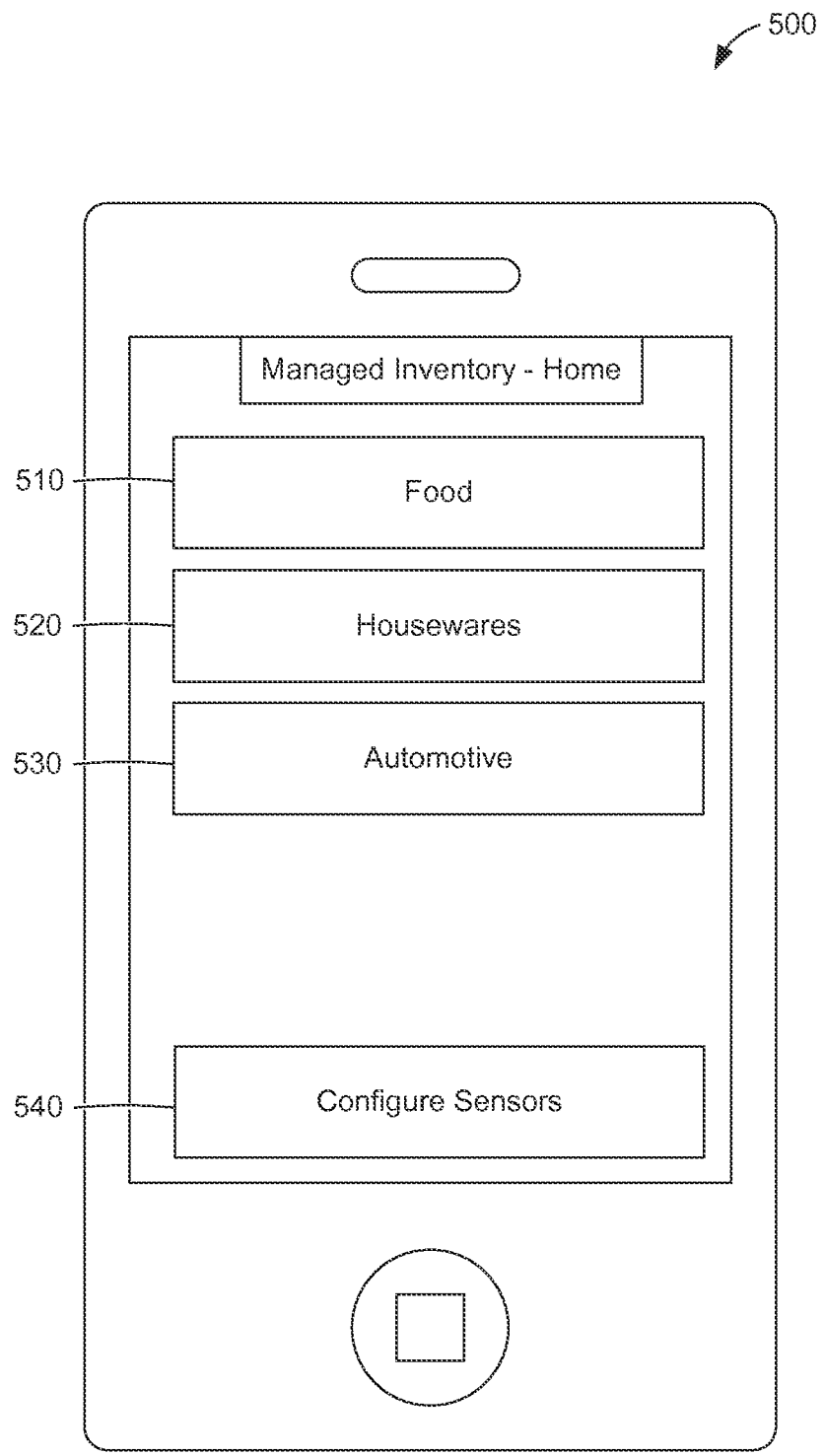
FIG. 5 is a block diagram illustrating a user interface suitable for a managed inventory, according to some example embodiments.

FIG. 5 is a block diagram illustrating a user interface 500 suitable for a managed inventory, according to some example embodiments. The UI 500 includes buttons 510-540, operable by touching a touch screen, clicking a mouse, selection using a keyboard, or otherwise.

The UI 500 shows options for configuring a managed inventory for a home, and may be displayed on a graphics display 1810 of a device 150 (e.g., a smart phone or desktop computer of the user 160). The button 510, labeled "food," is operable to cause the display of options related to an inventory of food items. Similarly, the buttons 520 and 530, labeled "housewares" and "automotive," respectively, are operable to cause the display of options related to inventories of housewares and automotive items. The button 540, labeled "configure sensors," is operable to cause the display of options related to sensors of the system. The function of the screens displayed by use of the buttons 510 and 540 are described in more detail with respect to FIGS. 6-8, below.

Figure 6:
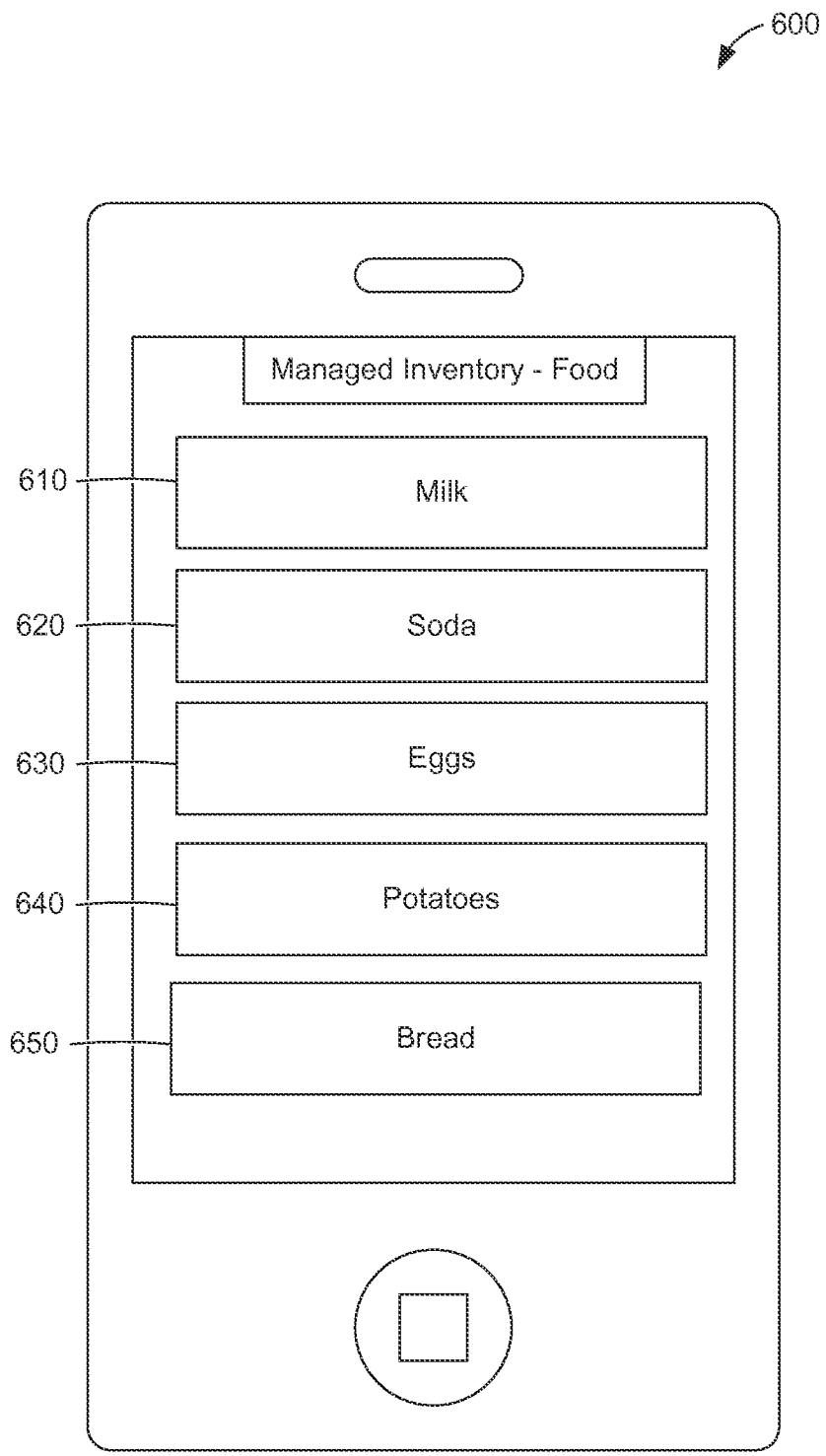
FIG. 6 is a block diagram illustrating a user interface suitable for a managed inventory, according to some example embodiments.

FIG. 6 is a block diagram illustrating a user interface 600 suitable for a managed inventory, according to some example embodiments. The UI 600 includes buttons 610-650, operable by touching a touch screen, clicking a mouse, selection using a keyboard, or otherwise. The UI 600 may be displayed in response to operation of the button 510 of FIG. 5.

Each of the buttons 610-650 is operable to cause the display of options related to managing the inventory of a corresponding food item. For example, operation of the button 620 is operable to cause the display of options related to managing the inventory of soda, as shown in more detail in FIG. 7.

Figure 7:
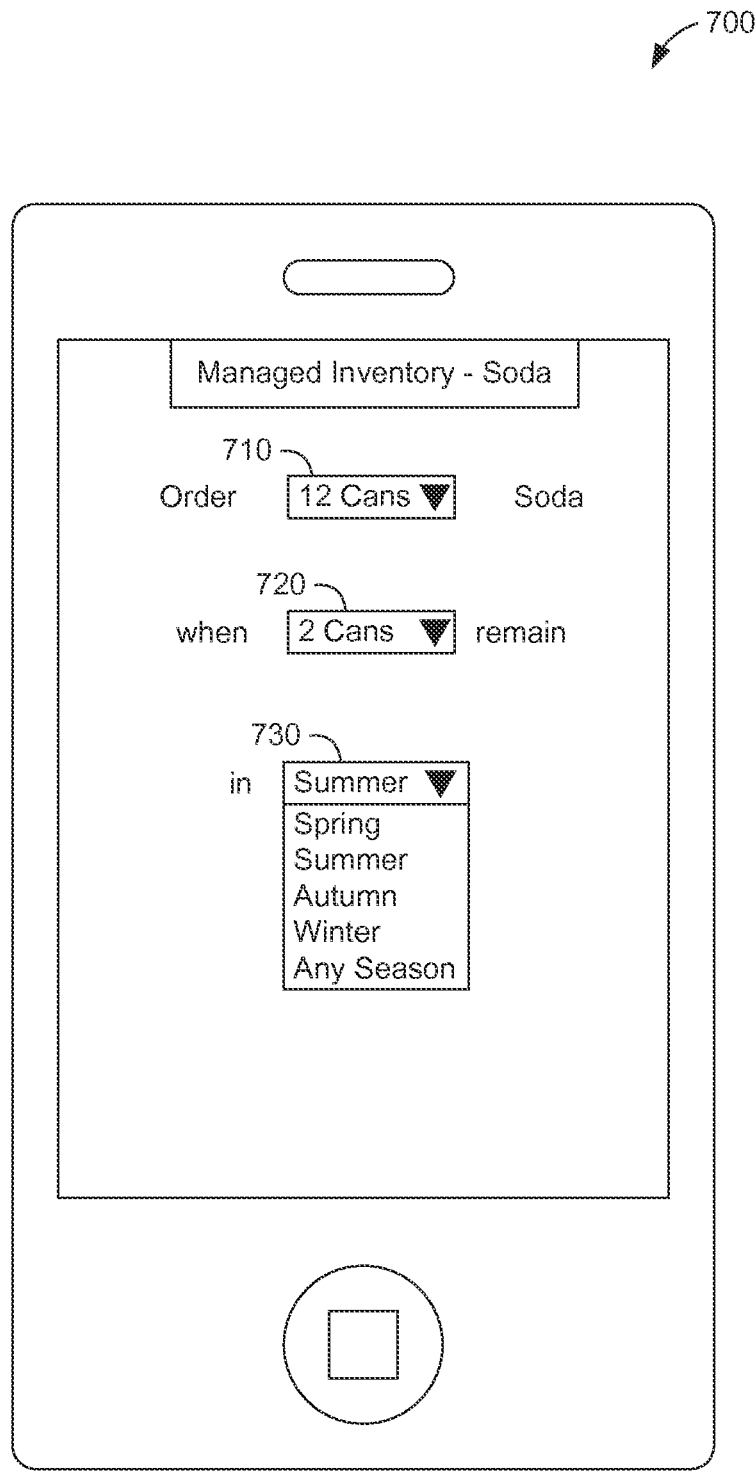
FIG. 7 is a block diagram illustrating a user interface suitable for a managed inventory, according to some example embodiments.

FIG. 7 is a block diagram illustrating a user interface 700 suitable for a managed inventory, according to some example embodiments. The UI 700 includes drop-down menus 710-730, operable by touching a touch screen, clicking a mouse, selection using a keyboard, or otherwise. The UI 700 may be displayed in response to operation of the button 620 of FIG. 6.

As shown in the UI 700, the current setting for the managed inventory of soda is to order 12 cans of soda when 2 cans remain in the summer. The drop-down menu 710 is operable to change the amount of soda to be ordered when the order criteria are met. The drop-down menu 720 is operable to change the threshold at or below which an order will be placed. The drop-down menu 730 is operable to select the season for which the threshold applies. In embodiments, date ranges other than seasons can be used. For example, date pickers for the start and end dates of a range can be presented. In some embodiments, the quantity to order and the threshold for multiple seasons is shown simultaneously. For example, a table could be shown with one row for each season or predetermined date range. The user can then set the quantity and threshold for each season or date range while simultaneously viewing the values for other seasons and date ranges. Menu options can be presented that are operable to accept or reject the changes. Alternatively or additionally, a back button on the device may be operable to accept the currently-displayed selections.

Figure 8:
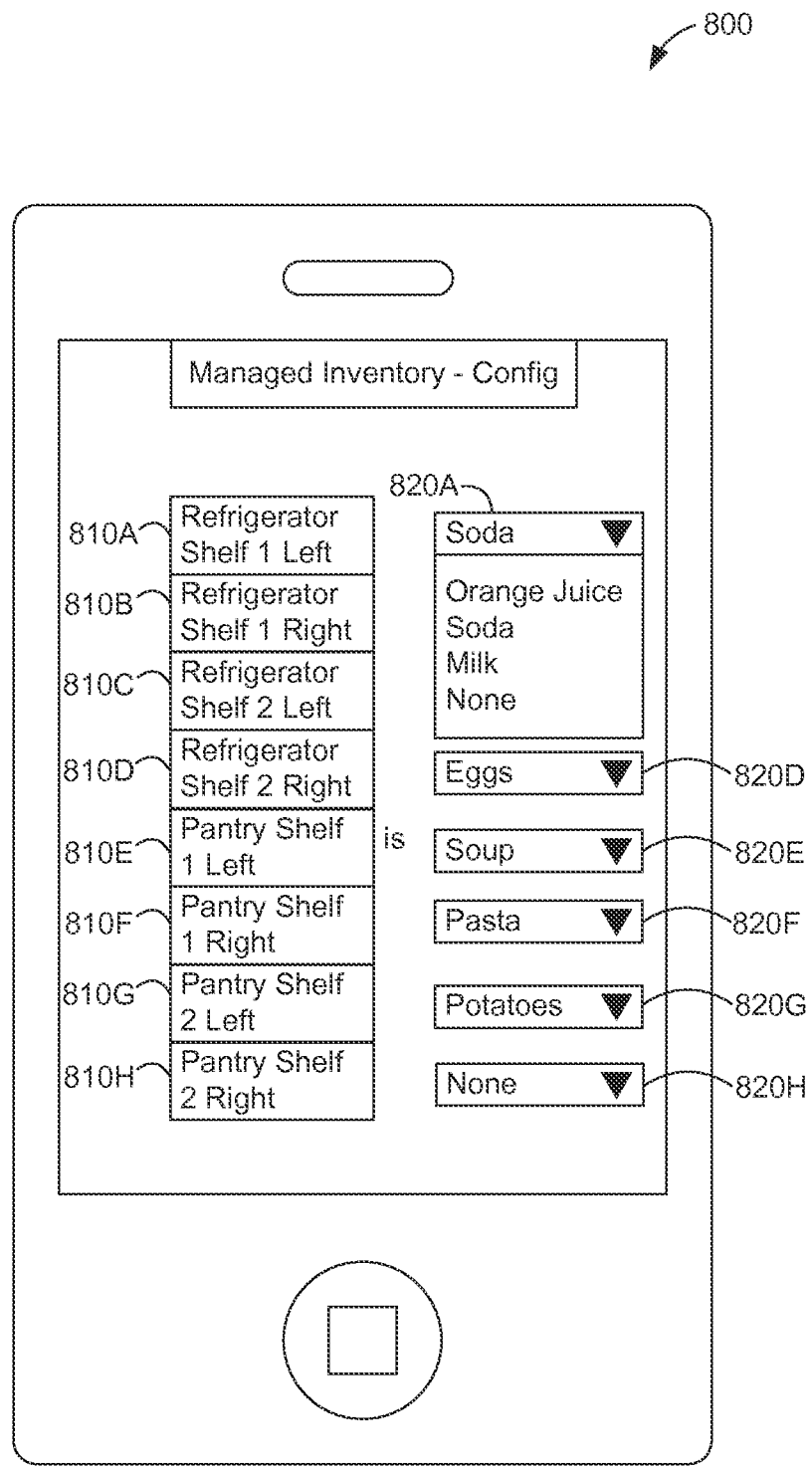
FIG. 8 is a block diagram illustrating a user interface suitable for a managed inventory, according to some example embodiments.

FIG. 8 is a block diagram illustrating a user interface 800 suitable for a managed inventory, according to some example embodiments. The UI 800 includes labels 810A-810H and corresponding drop-down menus 820A-820H, operable by touching a touch screen, clicking a mouse, selection using a keyboard, or otherwise. The UI 800 may be displayed in response to operation of the button 540 of FIG. 5. The labels 810A-810H may be referred to collectively as labels 810 or singularly as a label 810. Similarly, the drop-down menus 820A-820H may be referred to collectively as drop-down menus 820 or singularly as a drop-down menu 820.

The labels 810A-810H indicate the locations of sensors used to manage the inventory. In some example embodiments, the labels 810A-810H also indicate the type of each sensor. Information for additional sensors may be available to a user by scrolling up and down, or left and right.

The drop-down menus 820A-820H are operable to select the type of item being measured by the sensor indicated by the corresponding label 810. For example, the open drop-down menu 820A shows that soda, orange juice, or milk can be associated with the sensor labeled "refrigerator shelf 1 left." Additionally, the drop-down menu 820A shows that the sensor can be disassociated from any managed inventory item.

Figure 9:
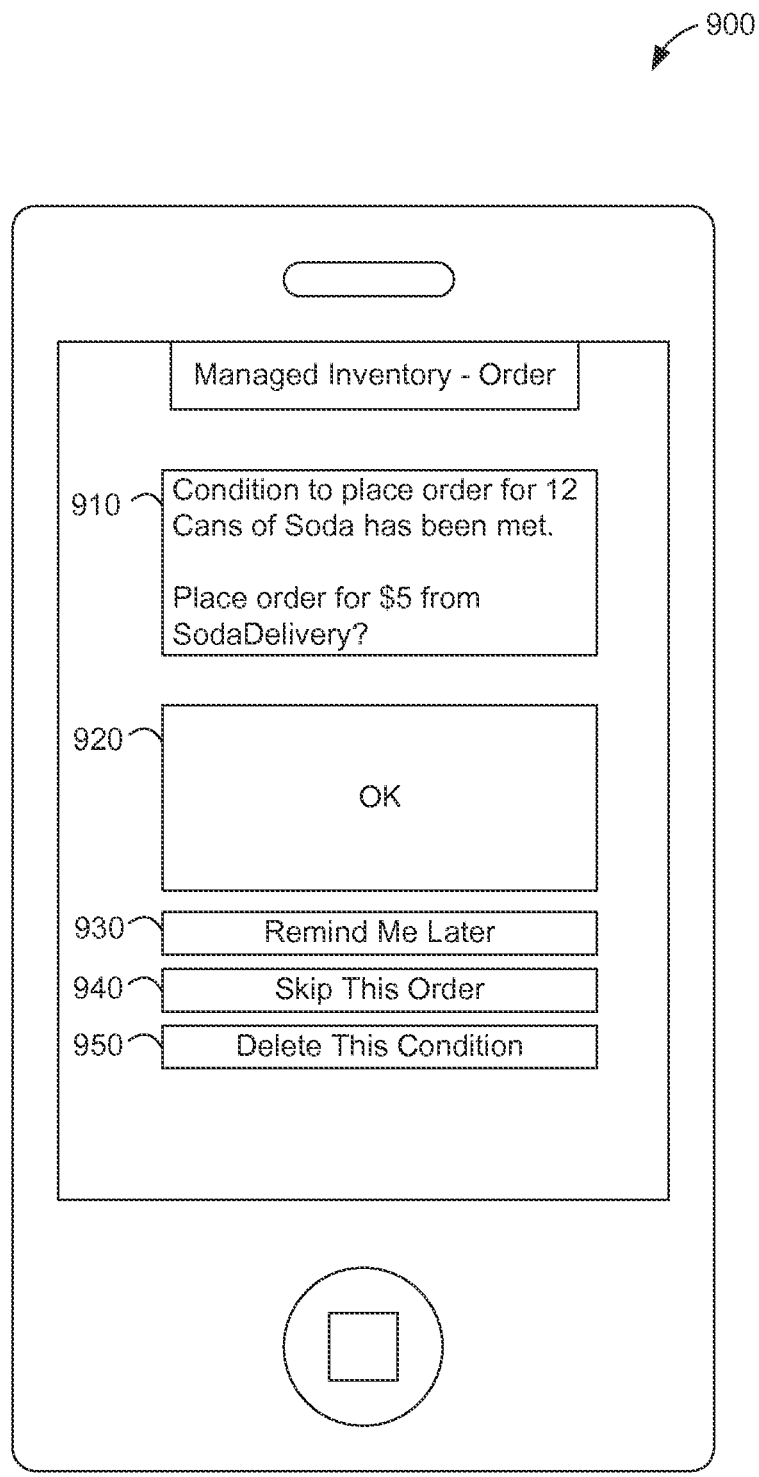
FIG. 9 is a block diagram illustrating a user interface suitable for a managed inventory, according to some example embodiments.

FIG. 9 is a block diagram illustrating a user interface 900 suitable for a managed inventory, according to some example embodiments. The UI 900 includes message 910 and buttons 920-950, operable by touching a touch screen, clicking a mouse, selection using a keyboard, or otherwise. The UI 900 may be presented by the input module 310 in response to a determination by the condition module 220 that a condition set by the user has been met and identification of an order to place by the order module 230, in embodiments in which a user confirmation is requested prior to the placement of an order.

The message 910 informs the user of the item for which the condition has been met. In some example embodiments, the user is also informed of the price and the selected provider of the item, as shown in FIG. 9. Additionally or alternatively, the message 910 may include an expected delivery date and information about other ordering options.

The buttons 920-950 are operable by the user to select a desired response to the automatically-generated order. In various embodiments, more or fewer options are displayed. The button 920, labeled "OK," is operable to place the order as generated by the order module 230. The button 930, labeled "Remind Me Later," is operable to dismiss the message 910 for the time being, but to cause the message 910 to reappear in the future. For example, the UI 900 may reappear after an hour, 24 hours, or another predetermined delay. The button 940, labeled "Skip This Order," is operable to dismiss the message 910, and to prevent an automatic order from being placed until the condition is no longer met and then is triggered again. For example, if the user will replenish the stock of the item through a different channel, but wants to keep automatic inventory management of the item operating for the future, the button 940 would be chosen. The button 950, labeled "Delete This Condition," is operable to delete the condition and its corresponding conditional action that resulted in the presentation of the UI 900. Operation of the button 950 also prevents the suggested order from being placed.

Figure 10:
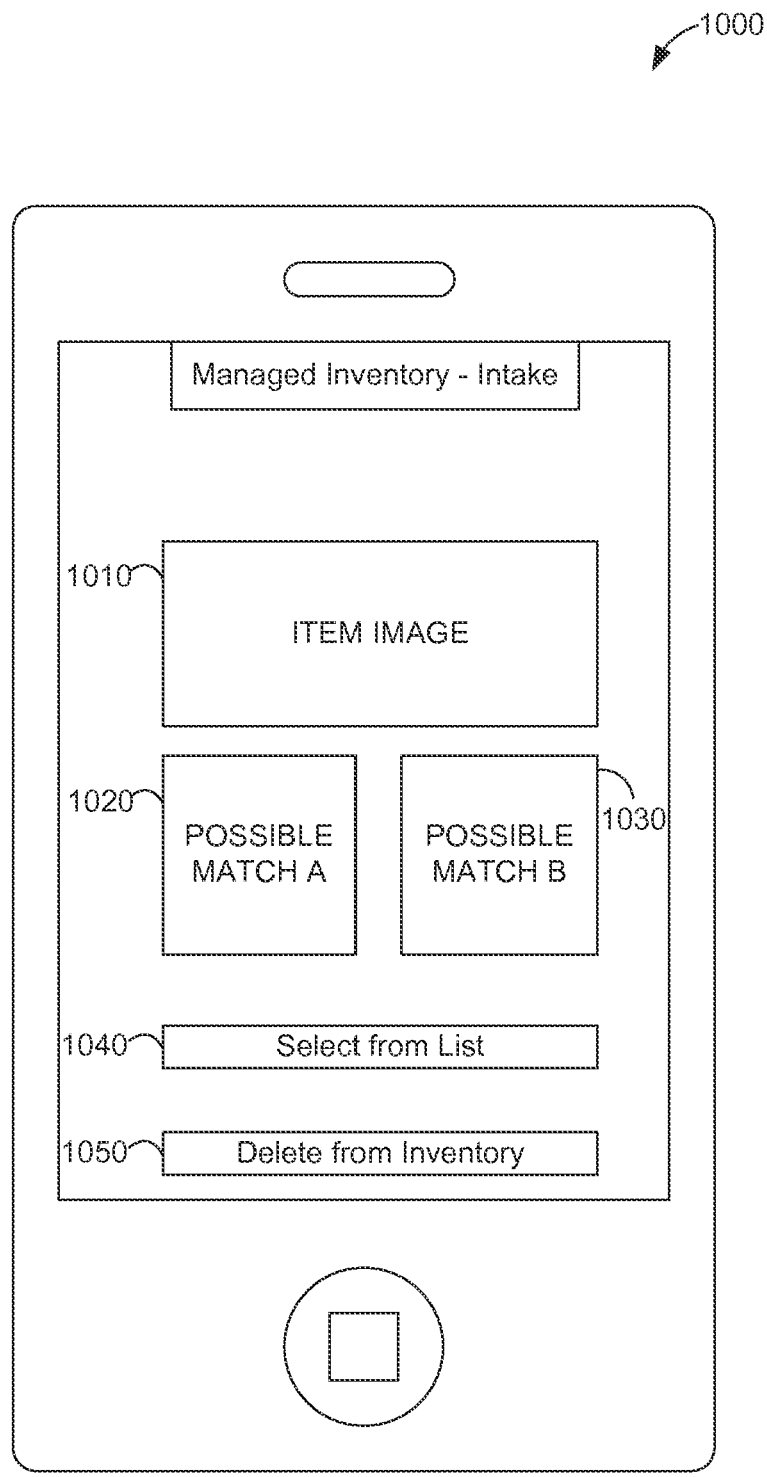
FIG. 10 is a block diagram illustrating a user interface suitable for a managed inventory, according to some example embodiments.

FIG. 10 is a block diagram illustrating a user interface 1000 suitable for a managed inventory, according to some example embodiments. The UI 1000 includes images 1010-1030 and buttons 1040 and 1050. The images 1020 and 1030 and the buttons 1040 and 1050 are operable by touching a touch screen, clicking a mouse, selection using a keyboard, or otherwise. The UI 1000 may be presented by the input module 310 in response to a determination by the sensor module 210 that an item has been detected but cannot be positively identified.

The image 1010 is an image of the detected item. For example, a photo or infrared (IR) image of an object placed in a storage area, cupboard, or refrigerator may have been taken by a sensor (e.g., the camera 465), transmitted to the device 150, and presented on the display as image 1010. The images 1020 and 1030 are images of the closest matching items found. For example, if the user has placed a cabbage in the refrigerator, a weight sensor in the shelf of the refrigerator can determine the change in weight caused by adding the cabbage. Similarly, before and after photos of the shelf can be compared to identify the portion of the shelf that contains the cabbage. Accordingly, the after photo can be cropped to help the user focus on the newly-added item. By looking up the cabbage in an item database, based on the image of the cabbage and the weight of the cabbage, the item may be correctly identified, in which case the UI 1000 is not needed. Instead, the item can be directly added to the user's inventory. However, if, for example, the system in unable to determine if the cabbage is a cabbage or a head of iceberg lettuce, images 1020 and 1030 are presented, showing these two most likely matches. In other example embodiments, more or fewer likely matches may be shown.

By selecting one or the other of the images 1020 and 1030, the user informs the system as to which of the suggested items has been added. Accordingly, the system updates the user's inventory to reflect the user's selection. If neither of the images 1030 and 1030 correctly match the item shown in the image 1010, the user may use the button 1040 to bring up an interface with additional item options. For example, the next best matches may be shown, a list of items likely to be stored in the item location may be shown, or a hierarchy of items that the user can browse to select the correct item may be shown. The user may also use the button 1050 to delete the item from the inventory entirely.

Figure 12:
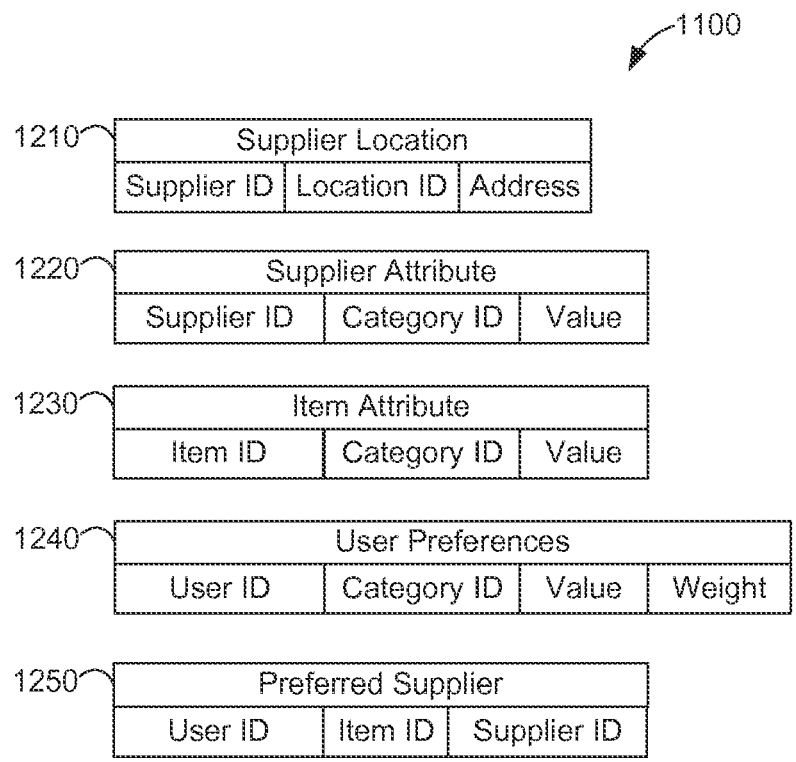

FIGS. 11-12 are block diagrams illustrating a database schema 1100 suitable for a managed inventory, according to some example embodiments. Shown in the database schema 1100 are the fields for a sensor table 1110, a condition table 1120, a user table 1130, an item table 1140, an inventory table 1150, a conditional action table 1160, an action preferences table 1170, a supplier table 1180, a supplier preferences table 1190, a supplier location table 1210, a supplier attribute table 1220, an item attribute table 1230, and a user preferences table 1240. In various embodiments, fewer or additional tables are used. Furthermore, in different embodiments, fewer or additional fields may be used in each table. For example, values that are stored in fields in the database schema 1100 may be unnecessary in certain embodiments, inferred by software in certain embodiments, and stored in other tables in certain embodiments. Accordingly, the database schema 1100 is provided by way of example and not limitation.

The sensor table 1110 contains one row for each sensor. Information for each sensor includes a sensor identifier, a type, a label, a location, and a value. The sensor identifier is a unique identifier for each sensor that allows the row in the sensor table 1110 to be referred to by computer programs and other tables in the database. The type is a machine-readable identifier (e.g., an integer or short character string) that can be used by computer programs in presenting data for the sensor. For example, if the type field for the sensor indicates that it is a weight sensor that reports values in pounds, a UI allowing the user to configure a criterion that uses the weight sensor can include the units of "pounds" when requesting the user to enter a threshold value. The label is a human-readable identifier (e.g., a character string) that can be used by computer programs in presenting data for the sensor. For example, the label may indicate the location of the sensor, the purpose of the sensor, or other information that may help a user correctly configure criteria based on the sensor. The location field identifies the location of the sensor. The location of the sensor may be used in a UI, to help the user recognize the sensor. Similarly, the location can be used in a UI to organize sensors for presentation. The value field stores the last-read value for the sensor.

The condition table 1120 contains one row for each criterion in each condition. Note that a condition may depend on multiple criteria. Each row includes a condition identifier, a timestamp, a sensor or item identifier, a value, a type, and a duration. The condition identifier is a unique identifier for the condition that allows the set of criteria for the condition to be accessed by computer programs and other tables in the database. The timestamp identifies the time from which the criterion (barring duration) was continuously met.

The sensor identifier is a reference to the sensor table 1110 and identifies the sensor for which the criterion applies. Alternatively, the item identifier is a reference to the inventory table 1150. Used in conjunction with the user identifier in the conditional action table 1160, the item allows the quantity of a user's inventory of an item to be used as a sensor input for the condition.

The value is a threshold to which the value reported by the sensor is compared. The type field indicates the type of comparison that is performed. Comparisons such as less than, equal to, greater than, or any suitable combination thereof may be indicated by the type field. The duration field indicates a minimum period of time that the comparison must be true before the criterion will trigger an action. In some example embodiments, the timestamp and duration fields are not used, and criteria based on duration are not supported.

The user table 1130 contains one row for each user. Each row includes a user identifier, a payment account, an address, and a preferences field. The user identifier is a unique identifier for each user that allows the user to be referred to by computer programs and other tables in the database. The payment account identifies a payment account of the user that can be charged when placing orders on the user's behalf. The address identifies a shipping address to which orders placed for the user can be delivered. The preferences field includes one or more preference settings for the user, either directly in the user table 1130 or as a reference to a preferences table (not shown). For example, the preferences field may indicate whether the user wants to be informed before orders are placed or if the user prefers for orders to be placed automatically when their conditions are met.

The item table 1140 contains one row for each item in the database. The row contains a unique item identifier for the item, along with other information about the item, such as a name and a description. The name and description can be used for presentation to a user, for matching to item names and descriptions provided by suppliers, or both. In some example embodiments, additional fields or tables for mapping the item identifier used in the database schema 1100 to a supplier-specific item identifier are used.

The inventory table 1150 contains one row for each item owned by each user. Accordingly, while there may be multiple rows for each user identifier and multiple rows for each item identifier, there is only one row for each unique pair of user identifier and item identifier. The row stores the quantity of the item owned by the user and, optionally, a sensor identifier. The sensor identifier, if present, identifies a sensor in the sensor table 1110 that provides information used to determine the quantity. For example, an image capture and processing sensor that counts a number of items can be linked to a row in the inventory table 1150. When the value field of the sensor is updated, the quantity in the inventory table 1150 can also be updated to reflect the number of items counted. As another example, a printing usage sensor that counts a number of pages of paper used can be linked to a row in the inventory table 1150 for paper. When the value field of the sensor is updated, the quantity of paper available can be decremented to reflect the used paper. The type field of the sensor table 1110 can be used to indicate whether the linked sensor reports amounts available or amounts used.

The conditional action table 1160 contains one row for each conditional action. Each row includes an action identifier, a condition identifier, an item identifier, a quantity of the item, a user identifier, and a status. The action identifier is a unique identifier for each conditional action that allows the conditional action to be referred to by computer programs and other tables in the database. The condition identifier is a reference to the condition table 1120, and identifies the criteria that must be met in order to trigger the conditional action. The item identifier is a reference to the item table 1140 and identifies the item to be ordered when the conditions are met. The quantity identifies the number or amount of the item to be ordered when the conditions are met. The user identifier is a reference to the user table 1130 and identifies the user on whose behalf an order of the item will be placed when the conditions are met. The status reflects the current status of the conditional action. For example, the status values below may be used.

| Status Value | Meaning |
| --- | --- |
| 1 | Condition Not Met |
| 2 | Condition Met, Further Processing Needed |
| 3 | Condition Met, Order Pending Approval |
| 4 | Condition Met, Order Placed |
| 5 | Condition Met, Order Skipped |

The action preferences table 1170 contains one row for each conditional action. Each row in the action preferences table 1170 contains an action identifier, a price weight, a time weight, and a source weight. The action identifier corresponds to the action identifier in the conditional action table 1160 and indicates for which action preferences are stored. The price weight, time weight, and source weight can be used when multiple suppliers are available for the item indicated in the corresponding row of the conditional action table 1160. For example, the shopping module 240 may use the weights to balance competing advantages before placing an order for the item, as discussed in more detail with respect to FIG. 16, below.

The supplier table 1180 contains one row for each item supplied by each supplier. Each row in the supplier table 1180 contains a supplier identifier that uniquely identifies the supplier and an item identifier that identifies the item. Thus, when the conditions for a conditional action are met, querying the supplier table 1180 for all rows matching the item identifier will give a result set that indicates all suppliers having the item. Each row in the supplier table 1180 also indicates the supplier's price for the item and the delivery date. In example embodiments, additional columns may be present, indicating other information such as the availability of expedited shipping, quantity discounts, and so on.

The supplier preferences table 1190 contains a set of rows for each user. Each row in the supplier preferences table 1190 indicates a rank for a supplier, on a per-user basis. Information in the supplier preferences table 1190 may be used by the shopping module 240 in conjunction with the source weight field of the action preferences table 1170 in determining which supplier to use to place an order.

FIG. 12 continues the description of the example database schema 1100. The supplier location table 1210 contains one or more rows for each supplier. Different rows for a supplier can be distinguished by the use of a location identifier. Each row in the supplier location table 1210 indicates an address for the supplier. Information in the supplier location table 1210 may be used by the shopping module 240 to determine an address for a supplier of an item. For example, if the user opts to pick up an item rather than have it delivered, the address of the supplier may be provided to the user so that the user can drive to the address to retrieve the item.

The supplier attribute table 1220 contains a set of rows for each supplier. Each row in the supplier attribute table 1220 indicates a category identifier for the attribute of the supplier and a value for the attribute. For example, a category identifier may indicate that the value is a fixed-price shipping cost and the corresponding value may indicate the fixed-price shipping cost for the supplier (e.g., 0 for free shipping). As another example, the category identifier may indicate that the value is a quality or price-range indicator and the corresponding value may indicate the corresponding class of the supplier (e.g., economy goods, average goods, or luxury goods).

The item attribute table 1230 contains a set of rows for each item. Each row in the item attribute table 1230 indicates a category identifier for the attribute of the item and a value for the attribute. The categories and valid values for the rows of the item attribute table 1230 may be the same as or different from the categories and values of the supplier attribute table 1220. For example, an item, like a supplier, may be categorized as economy or luxury.

The user preferences table 1240 contains a set of rows for each user. Each row in the user preferences table 1240 indicates a category identifier for an attribute, a value for the attribute, and a weight for the user's preference for the attribute. For example, a user that only orders items with free shipping may have a preference with a category identifier for fixed-cost shipping, a value of 0, and a weight of 100. As another example, a user with a preference for economy goods may have a preference with a category identifier for quality, a value of economy, and a weight of 20.

The preferred supplier table 1250 contains a set of rows for each user. Each row in the preferred supplier table 1250 indicates a preferred supplier for a particular item. For example, one row may indicate that a first user prefers Store A for Product X. Another row may indicate that a second user prefers Store B for Product X. A third row may indicate that the first user prefers Store C for Product Y, and so on.

The user preferences, in combination with the supplier and item attributes, can be used by the shopping module 240 to generate a recommendation of a supplier for a particular item.

Figure 13:
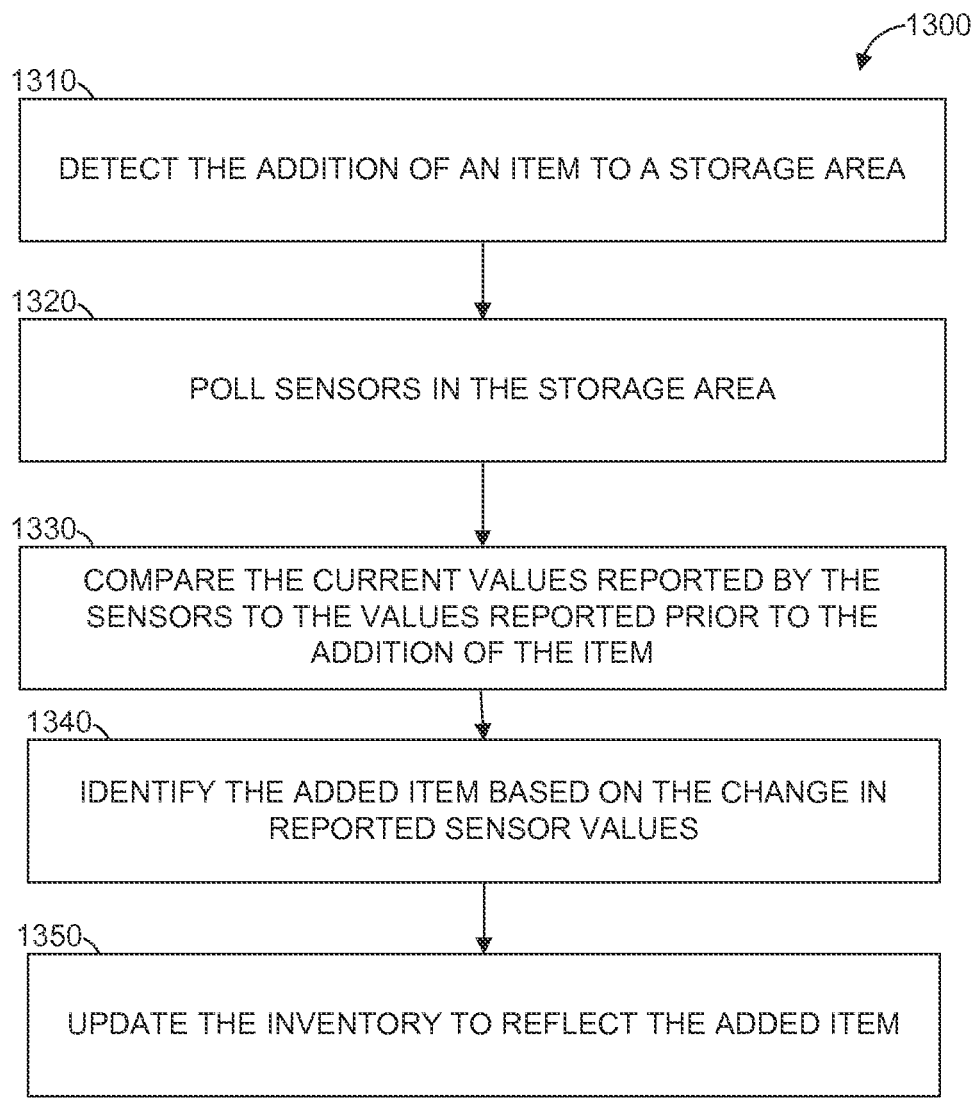
FIG. 13 is a flow diagram illustrating operations of a method for managing an inventory, according to some example embodiments.

FIG. 13 is a flowchart illustrating operations of the inventory management machine 130 using the database schema 1100 in performing a process 1300 of managing an inventory, according to some example embodiments.

The addition of an item to a storage area is detected in operation 1310 by the inventory management machine 130. For example, a storage area may have multiple sensors including an image sensor and a weight sensor. When the weight sensor reports an increase in the weight of items in the storage area, the inventory management machine 130 can conclude that something has been added to the storage area. Based on this conclusion, an image of the storage area can be captured. The current image of the storage area can be compared to a previous image to identify the changes, which will show the added item.

Alternative or additional sensors may also be used to determine that an item has been added and to gather information about it. For example, an added item may have a RFID tag attached to it. The sensor may be an RFID detector. By detecting a new RFID tag, the addition of an item is detected. Via a database lookup, information about the tagged item is retrieved.

As another example, an IR sensor can be used to generate a topology of the storage area. For example, a pair of IR cameras in conjunction with an IR emitter, as used in Microsoft's Kinect, can create a three-dimensional model of a surface. This technology utilizes binocular vision to determine the distance of each point from the pair of cameras. As another example, a single camera in conjunction with a dot projector can also create a three-dimensional model of a surface. This technology utilizes the distortion in a projected dot field caused by objects to create the three-dimensional model. The topology of the storage area can show changes caused by adding an item. The topology can also give a shape of the added item.

The sensors in the storage area are polled by the sensor module 210 to gather additional information about the item in operation 1320. In some example embodiments, the order of operations 1310 and 1320 are reversed, or the operations are combined. For example, a weight sensor may be used to trigger the determination that an item has been added, and IR sensors, image sensors, or RFID detectors polled to update the information about the storage area.

In operation 1330, the current values reported by the sensors are compared to the prior values for the sensors, to determine the changes brought about by the addition of the item. For example, the weight of the item can be determined by the change in weight, the height of the item can be determined by measuring the topology of the storage area, and the area of the item can be determined by a force or pressure sensor integrated into the floor of the storage area.

The item is identified by the identification module 250 using a database lookup in operation 1340. The database may be a user-specific database of items previously purchased by the user, or a global database of all known items. The database may be stored on the database machine 135, on the inventory management machine 130, or any suitable combination thereof. In some example embodiments, both databases are used, and the global database is only searched if no satisfactory match is found in the user-specific database. Items matching (or within a predetermined range) of the measured values for the item are found. The closest-matching item is taken to be the match. If no item has a confidence level that exceeds a predetermined threshold, a user may be requested to resolve the ambiguity. For example, the UI 1000 may be presented to a user to select the correct item. Once the correct item is identified, the inventory of the user is updated in operation 1350.

In some example embodiments, a suggestion for re-ordering an item is automatically presented to the user when the inventory drops to zero. The user can then choose to accept the automatic order without creating a new conditional action for the item, accept the automatic order and create a new conditional action for the item, reject the order, or reject the order and instruct the system not to suggest re-ordering the item if it should be acquired again by the user in the future.

Figure 14:
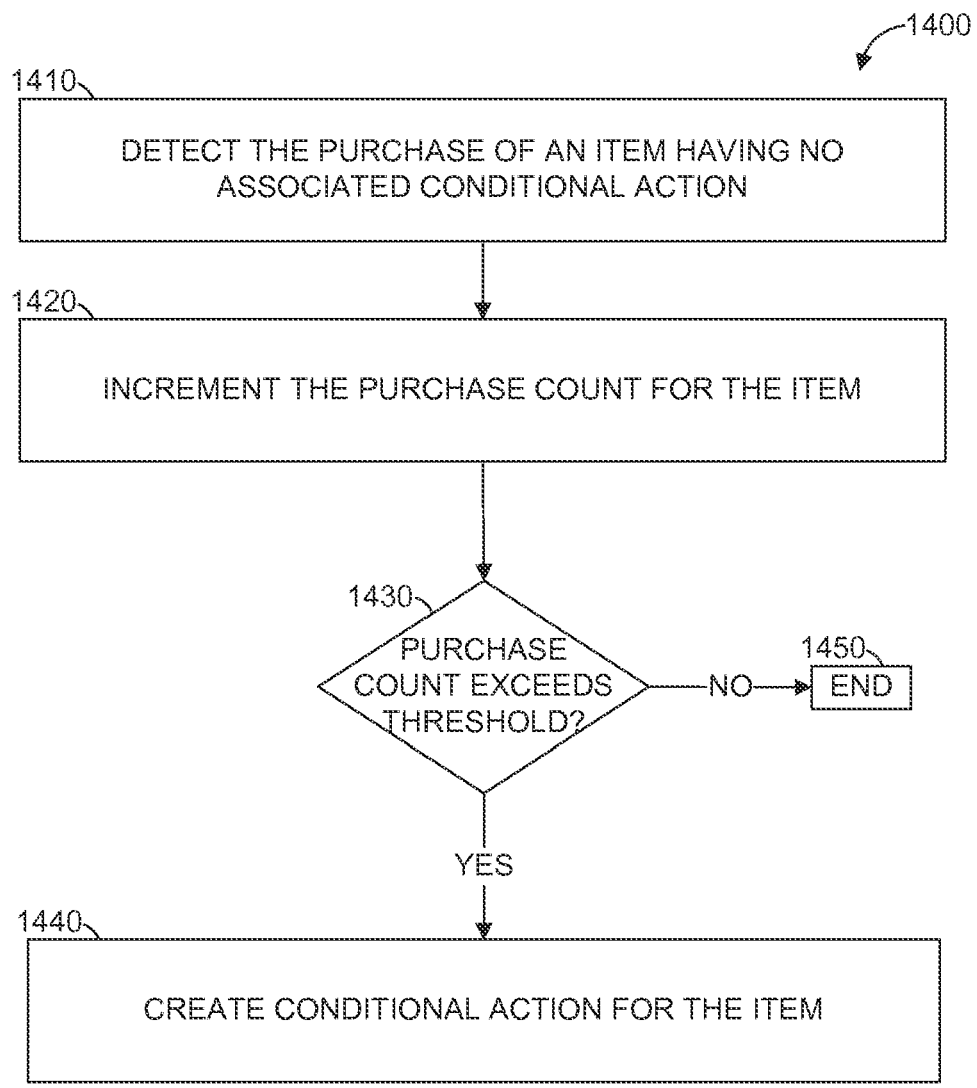
FIG. 14 is a flow diagram illustrating operations of a method for managing an inventory, according to some example embodiments.

FIG. 14 is a flowchart illustrating operations of the inventory management machine 130 using the database schema 1100 in performing a process 1400 of managing an inventory, according to some example embodiments.

In operation 1410, the purchase of an item having no associated conditional action is detected. For example, the process 1300 can be used to identify items and update an inventory. The item identifier of the added item can be used to determine if the user has any conditional actions (e.g., in the conditional action table 1160) for the item. If conditional actions are present, then the item is not of interest to the process 1400. If no conditional actions are present, processing continues with operation 1420.

The purchase count for the item is incremented in operation 1420. For example, a purchase count table (not shown) may be added to the database schema 1100, containing a count of purchases for each item for each user. As another example, the conditional action table 1160 can be used to store a null action for the item for the user, with the status field or another field used to count the number of purchases.

The purchase count for the item is compared to a threshold. The threshold may be defined on a per-user basis or as a system-wide value within the inventory management machine 130. If the threshold is met or exceeded (operation 1430), a conditional action for the item is created in operation 1440. If the threshold is not met, the process 1400 ends in operation 1450. For example, if the threshold is two, then when an item is purchased for the second time, a conditional action for the item is automatically generated. The generated conditional action may be defined on a per-user basis or as a system-wide value. For example, a user may specify that the threshold is three and that the conditional action will automatically order the item when the inventory of the new item drops to zero. As another example, a system default may specify that the threshold is two and that the conditional action will automatically re-order the new item when the inventory drops to zero.

Figure 15:
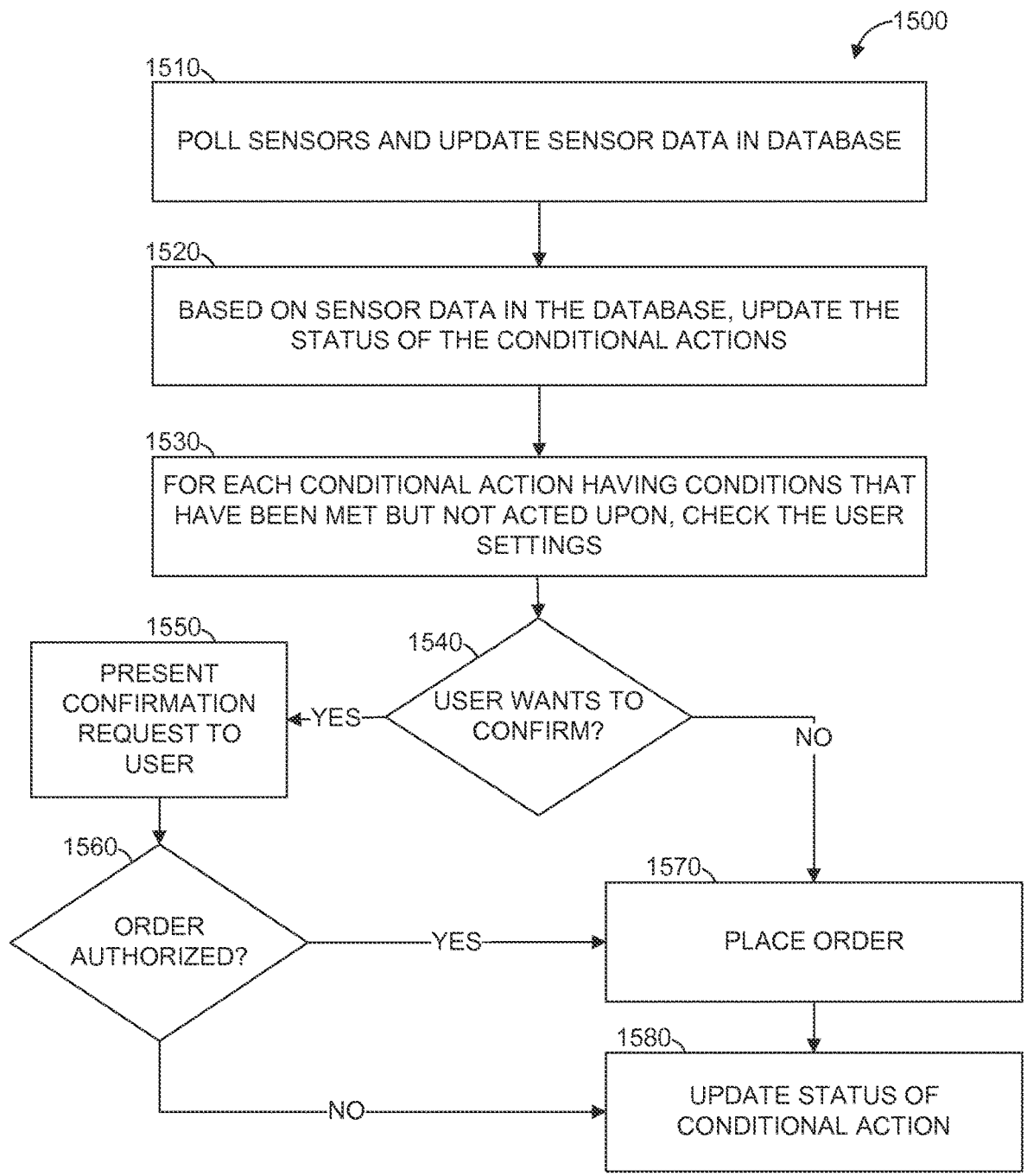
FIG. 15 is a flow diagram illustrating operations of a method for managing an inventory, according to some example embodiments.

FIG. 15 is a flowchart illustrating operations of the inventory management machine 130 using the database schema 1100 in performing a process 1500 of managing an inventory, according to some example embodiments.

In operation 1510, sensor data is received. The received sensor data indicates at least the sensor sending the data and a value. For example, the sensor module 210 may communicate with the sensor modules 320 of one or more devices 150. The sensor data may be from a single sensor or multiple sensors. For example, a scale in a woodshed may provide a weight measurement or multiple cameras may provide images. Data from multiple sensors may be of a single type or of different types. For example, each cupboard in a garage may have a weight sensor, and the weight data for each cupboard may be received. As another example, an office shelf holding paper may have a weight sensor and a photocopy machine may have a count of pages consumed, and the weight of the paper and the number of pages consumed may be received. Data in the value field of the sensor table 1110 of the database machine 135 is updated to reflect the received values.

The sensor data may be unprocessed or pre-processed by a device 150. For example, the sensor data from the weight sensor in the office shelf holding paper may be reported as a raw value, a weight, or a number of pages. To illustrate, the raw value of the weight may be measured as a sixteen-bit value, with 0x0000 representing no weight and 0xFFFF representing the maximum weight supported by the scale. If the maximum weight for the scale were 200 pounds, the raw value for 100 pounds could be represented as 0x8000. Continuing with the illustration, if the weight of the paper were 20 pounds per 1000 sheets, the weight measured by the sensor could be reported as 5000 sheets rather than 100 pounds.

With new sensor data, the conditions of the conditional actions stored in the conditional action table 1160 can be reevaluated. Accordingly, in operation 1520, the status field of the conditional action table 1160 is updated based on the sensor values by the sensor module 210. If a row in the inventory table 1150 refers to the sensor, then the quantity in that row can be updated, based on the value and type of the sensor reported in the sensor table 1110.

For example, the condition table 1120 can be queried to identify the sensor identifier, value, and type for each criterion that must be met to trigger the conditional action having the matching action identifier. The following psuedo-SQL implements this for the conditional action having an action identifier of 1: SELECT sensor ID, value, type from Condition WHERE condition ID=Conditional Action.condition ID AND Conditional Action.action ID=1. Similarly, the current values of the relevant sensors can be queried and compared to the condition values, based on the type of the condition.

The timestamp field of each checked row can also be updated at this time. For example, the timestamp field can be set to null to show that the condition is not met. Similarly, if the timestamp field is initially set to null, but the condition is met, the timestamp field can be set to the current time, to show that this is when the condition was first met. If the timestamp already had a value and the condition is still met, the timestamp field is not modified. In this way, both the information that the condition is currently met and the time at which the condition was first met are both available.

If the criterion has a value in its duration field, the criterion is only considered met if the elapsed time from the other portion of criterion has been continuously met for at least the duration. For example, if the duration is one week, the value is 10, the criterion type is "less than," the current value is 5, and the timestamp is 5 days ago, the condition would not be considered to be met. If the current value reported rose to 10, which is equal to and not less than the value specified in the criterion, the timestamp would be nullified, and the duration check would begin again when the value reported by the sensor falls below the criterion value again.

If all conditions are met, and the status was previously "Condition Not Met," then the status of the conditional action is updated to "Condition Met, Further Processing Needed." If at least one condition is not met, and the status was previously one of the "Condition Met" values, the status is updated to "Condition Not Met."

In operation 1530, each conditional action having a status that indicates that further action is required is processed by the condition module 220. For example, the status "Condition Met, Further Processing Needed" would trigger further processing in operation 1530. Accordingly, operations 1540-1580 are executed, as appropriate, for each such conditional action.

The condition module 220 performs a check of the preferences field of the user table 1130 in operation 1540. If the preferences field indicates that the user wants to confirm orders before they are placed, then a confirmation request is presented to the user in operation 1550. For example, the UI 900 may be presented by the input module 310.

If the user approves the order in operation 1560 or if the preferences field indicates that the user wants orders to be processed automatically, processing continues with operation 1570. In operation 1570, the order is placed by the order module 230, optionally in conjunction with the shopping module 240 performing the process 1600, discussed below.

After the order is placed or the user rejects the order, the status of the conditional action is updated in operation 1580. For example, if the order is placed, the status may be updated to "Condition Met, Order Placed." If the user chooses to skip the order, but keep the conditional action, the status may be updated to "Condition Met, Order Skipped." If the user chooses to be reminded later or does not respond, the status may be updated to "Condition Met, Order Pending Approval."

Consider a practical illustration in light of the process 1500. A farmer has an area in which feed is kept, and produces some feed on the farm while supplementing the feed by ordering from a distributor. In operation 1510, sensor data is received that indicates that the amount of feed remaining has fallen below a threshold. The database is updated to reflect this, in operation 1520. The farmer does not want food ordered immediately, but instead prefers to allow a period of time to elapse, in which either the farmer replenishes the feed from local production or does not. Accordingly, a duration was set in the row of the condition table 1120 that corresponds to the farmer's feed sensor. After the elapse of time, if the quantity of feed is still below the threshold, the order condition for feed is met (operation 1530), an order is placed by the order module 230 (operation 1570). The farmer may also set up a second conditional action, with a lower threshold value and no duration. In this way, the order will be placed without delay if the feed supply falls below the lower threshold.

In example embodiments, an elapse of time from the sending of the confirmation notice to the user (in operation 1550) without response may operate as a confirmation by the user. For example, a timestamp field can be added to the conditional action table 1160. The time of notification can be added to the timestamp field. The user preference regarding how long to wait before automatically ordering can be stored in the preferences field of the user table 1130 or in a separate preferences table. Alternatively or additionally, a default system-wide wait value can be used. In operation 1530, if the status of the conditional action indicates that the order is ready for user confirmation at the time elapsed since the time indicated in the timestamp field exceeds the time to wait before automatically ordering, then the process can proceed through operation 1540 as if the user did not want a confirmation notification to operation 1570, in which the order is placed.

As another example, consider a vendor selling cold soda who finds that soda sells better when it is hot outside. The vendor wants to have a varying delay on ordering soda, based on the input from a temperature sensor. For example, suppose the vendor wants to have a delay of 7 days if the temperature is below 85 degrees Fahrenheit and 4 days if the temperature is at or above 85 degrees. This case can be handled with the database schema 1100 by simply creating two conditional actions. Each conditional action has two criteria: the amount of soda remaining and the ambient temperature. The types of the ambient temperature criteria will be different, since one condition operates below 85 degrees and the other operates at or above 85 degrees. The durations of the conditions for the amount of soda remaining will be different, with the duration corresponding to the lower temperature being 7 days and the other duration being 4 days.

As another example using the soda vendor, the delay may be modified based on the date. For example, the delay may be four days between July 1 and August 31 and seven days at other times of the year. To implement this, a date sensor (e.g., the built-in computer clock) would be used instead of a temperature sensor. To support ranges instead of single values in criteria, a second value field can be added to the condition table 1120. Alternatively, two criteria can be used. For example, if the conditional action is only performed when the date is both after July 1 and before August 31, two criteria (with the same sensor identifier and different values and types) could be used without requiring modification to the condition table 1120.

Figure 16:
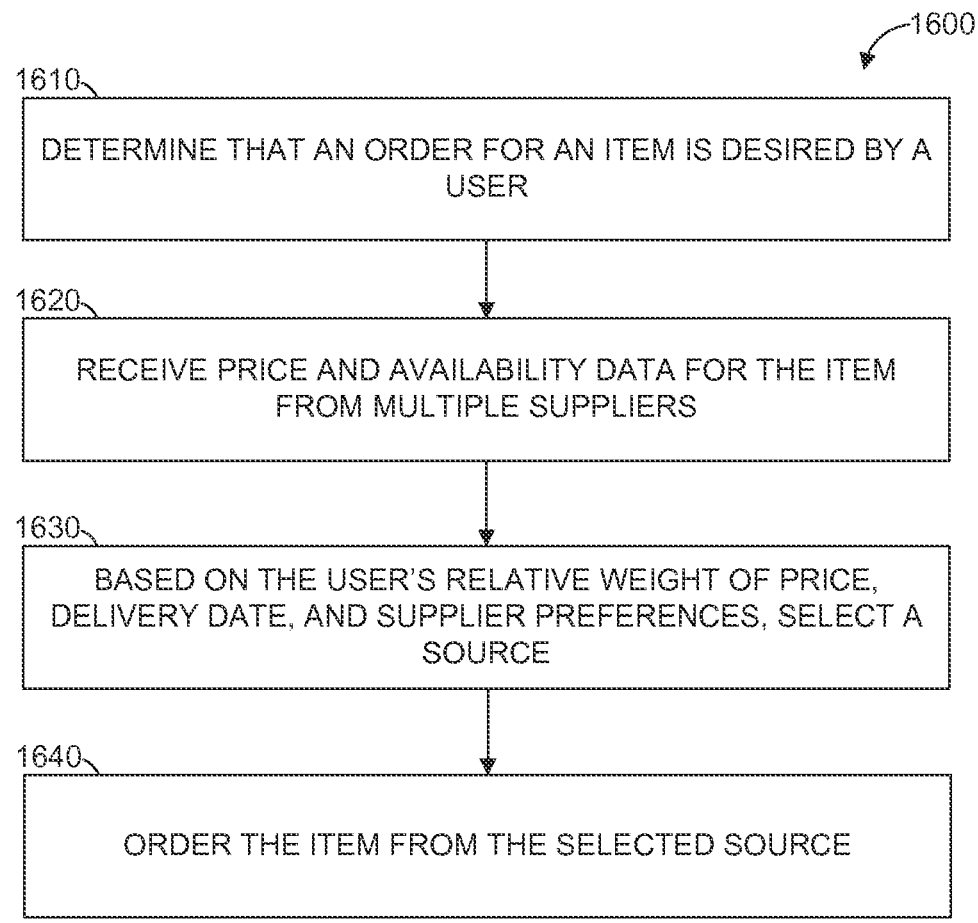
FIG. 16 is a flow diagram illustrating operations of a method for placing an order, according to some example embodiments.

FIG. 16 is a flowchart illustrating operations in performing a process 1600 of placing orders, according to some example embodiments. Operations in the process 1600 may be performed by the shopping module 240 of the inventory management machine 130, in conjunction with other modules described above with respect to FIG. 2.

In operation 1610, the shopping module 240 makes a determination that an order for an item is desired by a user. The order may originate from a user interacting with a user interface, from an order module 230 placing an order in response to an order condition being met, or from another source. The order includes a quantity of an item.

In operation 1620, price and availability data for the item from multiple sources is received by the shopping module 240. A source may be a seller on an e-commerce site, an e-commerce site, or another entity capable of providing the item. Availability data may be received via a programmatic interface, a web interface, or another interface. For example, the sources may provide an application protocol interface (API) usable by the shopping module 240 to query the availability of items. As another example, the shopping module 240 may access a web site for each source and parse the item descriptions presented to determine whether the item is available from that source. The availability data may include additional information about a potential order of the item from the source. For example, the availability data may include a price of the item, a shipping time, a shipping rate, and a quantity available. Based on the availability data, the supplier table 1180 can be updated.

In operation 1630, a source is selected based on standardized or user-defined criteria. For example, the action preferences table 1170 can be used to provide separate selection criteria for each conditional action. In alternative embodiments, selection criteria are provided on a per-user or system-wide basis. For example, a user identifier can be substituted for the action identifier in the action preferences table 1170, causing the set of preferences to correspond to a user instead of to a conditional action.

In an example embodiment, the action preferences include a price weight, a time weight, and a source weight. Based on these weights, each supplier can be scored and the highest-scoring supplier selected. As an example, consider the equation:

Score=100−(Price Weight)*(Supplier's Price−Lowest Supplier Price)−(Time Weight)*(Supplier's Delivery Date−Earliest Supplier Delivery Date)−(Source Weight)*(Supplier's Rank−1).

In this example, if one supplier has the lowest price, the earliest delivery date, and is the customer's top-ranked supplier (as tracked, for example, by the supplier preferences table 1190), then that supplier will have a perfect score of 100 regardless of the weights. If the three weights are set equally at 5, then a supplier offering a price $6 above the lowest price, for delivery 3 days after the earliest delivery, and being the user's 3rd-ranked supplier, would have a score of 45 (100−5×6−5×3−5×(3−1)).

In an example embodiment, items, once ordered from a supplier, continue to be ordered from that supplier until the user selects a different supplier. For example, the preferred supplier table 1250 can be used as a look-up table when an item is to be ordered for a user. If a supplier identifier is found for the item to be ordered for the user, the corresponding supplier is used to order the item. If no supplier identifier is found, the user may be prompted to select a supplier or a supplier may be automatically selected for the user. For example, the scoring system described above can be used to select a supplier for the user.

Another scoring system that can be used to select a supplier is as follows. A score is generated for each supplier providing the item to be ordered. The list of suppliers for the item can be generated by accessing the supplier table 1180. The score for each supplier of the item can be generated by matching the categories and values of the user preferences (e.g., stored in the user preferences table 1240) with the categories and values of the supplier attributes (e.g., stored in the supplier attribute table 1220) and summing the weights of the matches for each supplier. For example, in pseudo-SQL, SELECT SUM(User Preferences.Weight) WHERE
UserPreferences.CategoryID=SupplierAttribute.
  CategoryID AND
UserPreferences.Value=SupplierAttribute.Value AND
SupplierAttribute.SupplierID={Supplier being scored}.

Once each supplier is scored, the highest-scoring supplier is selected for the item. An entry for the selected supplier may be added to the preferred supplier table 1250.

Supplier attributes may be inferred from item attributes. For example, when supplier attributes are available, the supplier attribute table 1220 may be populated directly, but when supplier attributes are unavailable, the supplier attribute table 1220 may be populated based on the item attribute table 1230 and the supplier table 1180. For each category identifier and value having at least one entry in the item attribute table 1230 for an item supplied by the supplier (as indicated by the supplier table 1180), a corresponding category identifier and value can be stored in the supplier attribute table 1220 for the supplier of the item. When only a single value exists for all items having the category identifier, that value is used. When multiple values exist, the most popular value may be used, a default value may be used, or another selection criterion may be used. For example, if a supplier provides 10 items having the economy value for price range and 50 items having the luxury value for price range, the value of luxury for the price range category may be used for the supplier, based on the higher frequency of luxury among items supplied by the supplier.

User preferences may be entered directly by the user (e.g., via a UI) or generated automatically. For example, when a user selects a supplier for an item, the user preferences table 1240 can be updated to reflect an implicit preference for the qualities of the supplier, the item, or both. Thus, the weight in the user preferences table 1240 for each category identifier and value associated with the item (in the item attribute table 1230), associated with the supplier (in the supplier attribute table 1220), or both, may be incremented based on the selection of the supplier for the item. As noted above, the selection of the supplier may, in turn, be automatically generated. In systems that automatically generate the selection of suppliers and user preferences, greater weight may be applied when a user explicitly overrides an automatic decision. For example, the preference weights may be incremented by one when the system implicitly determines a preference for a supplier, but incremented by ten when the user switches from an automatically-selected supplier to a user-selected supplier.

In some example embodiments, the e-commerce machine 120 or 140 may provide shopping history information to the inventory management machine 130 during an initial setup, during operation, or both. Information in the shopping history regarding previous items purchased and the corresponding suppliers may be used (e.g., as described above) to populate or update the supplier attribute table 1220, the user preferences table 1240, or both. Other sources of information regarding the shopping habits of the user may also be integrated.

In operation 1640, the item is ordered by the shopping module 240 from the highest-scoring supplier. For example, the shopping module 240 may send the user's address and credit card information along with the quantity of the item to be ordered to each of the e-commerce machines 120 and 140. The user's information may be retrieved from the user table 1130. The e-commerce machines 120 and 140 may cause the user's account to be charged for the ordered items and communicate the order to the appropriate parties (e.g., the sellers operating via the e-commerce machine 120 or 140, or the warehouse storing the physical items ordered).

Figure 17:
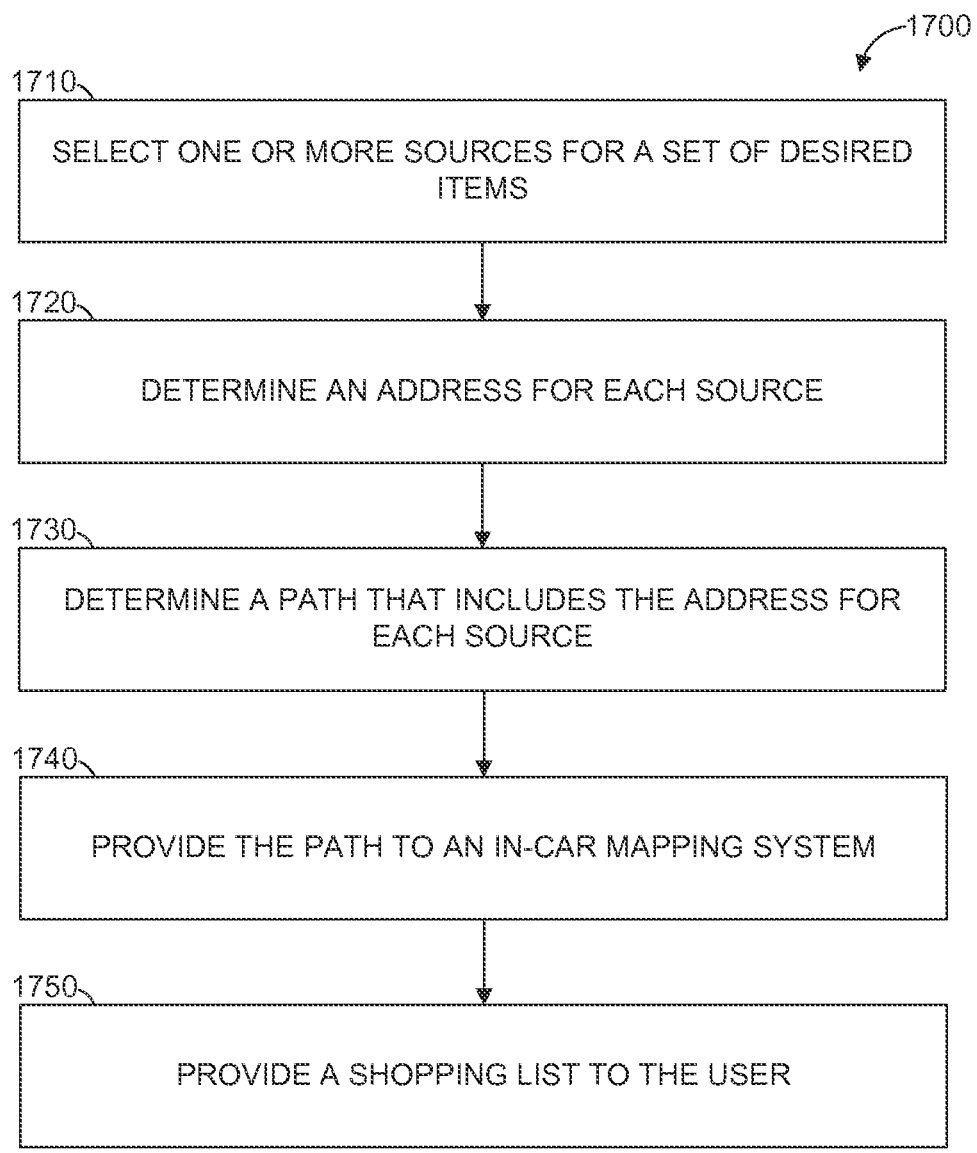
FIG. 17 is a flow diagram illustrating operations of a method for generating a shopping itinerary, according to some example embodiments.

FIG. 17 is a flow diagram illustrating operations of a process 1700 for generating a shopping itinerary, according to some example embodiments. Operations in the process 1700 may be performed by the shopping module 240 of the inventory management machine 130, in conjunction with other modules described above with respect to FIG. 2.

In operation 1710, one or more sources for a desired set of items are selected. For example, operations 1610-1630 of the process 1600 may be used to identify items and their sources. An address for each source is determined, in operation 1720. For example, the supplier location table 1210 of the database schema 1100 can be accessed to determine an address for the supplier. The address for each supplier may be an address of the retail outlet for the supplier closest to the address of the user. Other criteria may be used to select the address to supply to the user. For example, a supplier location that is along the user's commute route may be suggested over a supplier location that is nearer to the user's home, but less convenient. In some example embodiments, the source addresses are determined dynamically. For example, the shopping module 240 may send the supplier identifier and the user's address to the electronic commerce machine 130. The electronic commerce machine 130 may identify an appropriate address at which items from the source can be picked up and return that address to the shopping module 240.

A path beginning at the user's address and including the address for each source is generated in operation 1730. For example, the shortest round-trip path that includes the address for each source may be generated. The generated path is provided to an in-car mapping system in operation 1740. In alternative embodiments, the path is not generated by the shopping module 240. Instead, the addresses are sent to the in-car mapping system, which generates the path.

In operation 1750, a shopping list is provided to the user. For example, the list may include a list of items to be picked up from each source, organized by source, with the sources ordered in the same sequence as they will occur when the user follows the path.

In some example embodiments, the in-car mapping system is configured to provide the user with turn-by-turn directions along the path. The in-car mapping system may also be configured to communicate with parking lot sensors near the retail locations to which the user is directed. Based on the communications from the parking lot sensors, the user can be directed to park in an available parking spot conveniently located near the desired source.

According to various example embodiments, one or more of the methodologies described herein may facilitate the handling of user inventories, the processing of sensor data, and the generation of purchase orders based on those inventories and sensor data. Moreover, one or more of the methodologies described herein may facilitate the generation of orders for items needed by users without requiring the user to place the order or even recognize the need for the item. Furthermore, one or more of the methodologies described herein may facilitate the placement of orders with sources without requiring the user to evaluate the offerings of each source.

When these effects are considered in aggregate, one or more of the methodologies described herein may obviate a need for certain efforts or resources that otherwise would be involved in determining when to order items of interest and where to source them from. Efforts expended by a user in ordering items of interest may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 18:
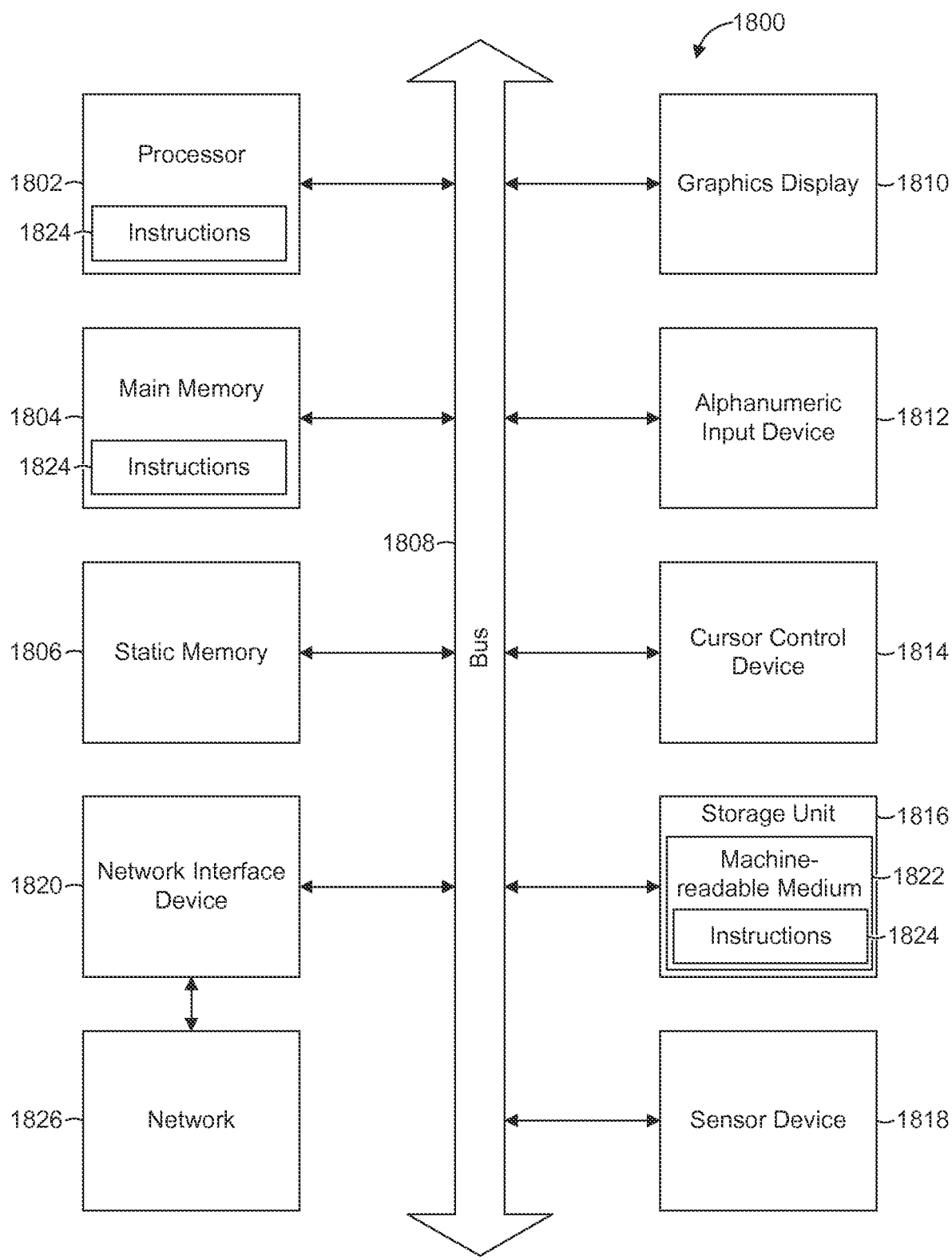
FIG. 18 is a block diagram illustrating components of a machine, according to some example embodiments, able to read instructions from a machine-readable medium and perform any one or more of the methodologies discussed herein.

FIG. 18 is a block diagram illustrating components of a machine 1800, according to some example embodiments, able to read instructions from a machine-readable medium (e.g., a machine-readable storage medium, a computer-readable storage medium, or any suitable combination thereof) and perform any one or more of the methodologies discussed herein, in whole or in part. The machine 1800 may be used to implement the e-commerce machine 120, the inventory management machine 130, and the devices 150. Specifically, FIG. 18 shows a diagrammatic representation of the machine 1800 in the example form of a computer system and within which instructions 1824 (e.g., software, a program, an application, an applet, an app, or other executable code) for causing the machine 1800 to perform any one or more of the methodologies discussed herein may be executed, in whole or in part. In alternative embodiments, the machine 1800 operates as a standalone device or may be connected (e.g., networked) to other machines. In a networked deployment, the machine 1800 may operate in the capacity of a server machine or a client machine in a server-client network environment, or as a peer machine in a distributed (e.g., peer-to-peer) network environment. The machine 1800 may be a server computer, a client computer, a personal computer (PC), a tablet computer, a laptop computer, a netbook, a set-top box (STB), a personal digital assistant (PDA), a cellular telephone, a smart phone, a web appliance, or any machine capable of executing the instructions 1824, sequentially or otherwise, that specify actions to be taken by that machine. Further, while only a single machine is illustrated, the term "machine" shall also be taken to include a collection of machines that individually or jointly execute the instructions 1824 to perform all or part of any one or more of the methodologies discussed herein.

The machine 1800 includes a processor 1802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1804, and a static memory 1806, which are configured to communicate with each other via a bus 1808. The machine 1800 may further include a graphics display 1810 (e.g., a plasma display panel (PDP), a light emitting diode (LED) display, a liquid crystal display (LCD), a projector, or a cathode ray tube (CRT)). The machine 1800 may also include an alphanumeric input device 1812 (e.g., a keyboard), a cursor control device 1814 (e.g., a mouse, a touchpad, a trackball, a joystick, a motion sensor, or other pointing instrument), a storage unit 1816, a sensor device 1818, and a network interface device 1820.

The storage unit 1816 includes a machine-readable medium 1822 on which is stored the instructions 1824 embodying any one or more of the methodologies or functions described herein. The instructions 1824 may also reside, completely or at least partially, within the main memory 1804, within the processor 1802 (e.g., within the processor's cache memory), or both, during execution thereof by the machine 1800. Accordingly, the main memory 1804 and the processor 1802 may be considered as machine-readable media. The instructions 1824 may be transmitted or received over a network 1826 (e.g., network 170) via the network interface device 1820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1800), such that the instructions, when executed by one or more processors of the machine (e.g., processor 1802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
 accessing history information for a user account, the history information including information for an item ordered by the user account;
 presenting a first user interface that includes a selector for sensors;
 receiving an input at the selector, the input being for a selection at the first user interface relating to the sensors;

presenting a second user interface that allows configuration of the sensors in response to receiving the input at the selector for the selection at the first user interface;
receiving a selection at the second user interface relating to the configuration of a first sensor of the sensors;
presenting a third user interface having a field to receive conditions for placing an order for the item;
receiving an input at the field of the third user interface corresponding to a condition for placing the order for the item;
configuring the first sensor based on the received configuration, the configuration relating to determining a duration of time;
electronically receiving first sensor data from the first sensor relating to the duration of time;
processing the first sensor data to determine if the duration of time exceeds a time threshold;
configuring a second sensor to detect an ambient temperature;
electronically receiving second sensor data from the second sensor relating to the ambient temperature;
processing the second sensor data to determine if a detected ambient temperature exceeds a temperature threshold;
determining an amount of the item used;
processing the first sensor data to determine a quantity of the item to be ordered, the quantity of the item to be ordered being determined based on the amount of the item used, the duration of time, the ambient temperature, and variable based on whether the duration of time exceeds the time threshold and whether the detected ambient temperature exceeds the temperature threshold; and
causing delivery of the item by a delivery date to a shipping address based on the duration of time exceeding the time threshold and the detected ambient temperature exceeding the temperature threshold.

2. The method of claim 1, the method further comprising:
determining preferences for the user account that include a first weight for a first preference of the user account for a first attribute pertaining to shipping and a second weight for a second preference of the user account for a second attribute for a plurality of suppliers;
determining a score for each supplier of the plurality of suppliers based on the first weight and the second weight; and
determining a supplier to provide the item for the user based on the score.

3. The method of claim 2, the method further comprising:
accessing data for the first attribute for a plurality of suppliers, each supplier of the plurality of suppliers being able to supply the item to be ordered; and
accessing data for the second attribute for the plurality of suppliers, wherein determining the score further includes determining the weights based on the data for the first attribute for the plurality of suppliers, and the data for the second attribute for the plurality of suppliers.

4. The method of claim 2, the method further comprising sending an order for the item to an electronic commerce server associated with the supplier, for pick-up.

5. The method of claim 4, the method further comprising:
sending, to a second electronic commerce server associated with an additional supplier for an additional item, an additional order for pick-up;
determining a path from a location associated with the user account to a location of the additional supplier via a location of the supplier; and
sending the path to an in-car mapping device.

6. A system comprising:
a processor for a machine configured to perform operations comprising:
accessing history information for a user account, the history information including information for an item ordered by the user account;
presenting a first user interface that includes a selector for sensors;
receiving an input at the selector, the input being for a selection at the first user interface relating to the sensors;
presenting a second user interface that allows configuration of the sensors in response to receiving the input at the selector for the selection at the first user interface;
receiving a selection at the second user interface relating to the configuration of a first sensor of the sensors;
presenting a third user interface having a field to receive conditions for placing an order for the item;
receiving an input at the field of the third user interface corresponding to a condition for placing the order for the item;
configuring the first sensor based on the received configuration, the configuration relating to determining a duration of time;
electronically receiving first sensor data from the first sensor relating to the duration of time;
processing the first sensor data to determine if the duration of time exceeds a time threshold;
configuring a second sensor to detect an ambient temperature;
electronically receiving second sensor data from the second sensor relating to the ambient temperature;
processing the second sensor data to determine if a detected ambient temperature exceeds a temperature threshold;
determining an amount of the item used;
processing the first sensor data to determine a quantity of the item to be ordered, the quantity of the item to be ordered being determined based on the amount of the item used, the duration of time, the ambient temperature, and variable based on whether the duration of time exceeds the time threshold and whether the detected ambient temperature exceeds the temperature threshold; and
causing delivery of the item by a delivery date to a shipping address based on the duration of time exceeding the time threshold and the detected ambient temperature exceeding the temperature threshold.

7. The system of claim 6, the operations further comprise:
determining preferences for the user account that include a first weight for a first preference of the user account for a first attribute pertaining to shipping and a second weight for a second preference of the user account for a second attribute for a plurality of suppliers;
determining a score for each supplier of the plurality of suppliers based on the first weight and the second weight; and
determining a supplier to provide the item for the user based on the score.

8. The system of claim 7, the operations further comprise:
accessing data for the first attribute for a plurality of suppliers, each supplier of the plurality of suppliers being able to supply the item to be ordered; and
accessing data for the second attribute for the plurality of suppliers, wherein determining the score further includes determining the weights based on the data for the first attribute for the plurality of suppliers, and the data for the second attribute for the plurality of suppliers.

9. The system of claim 7, the operations further comprise sending an order for the item to an electronic commerce server associated with the supplier, for pick-up.

10. The system of claim 9, the operations further comprise:
sending, to a second electronic commerce server associated with an additional supplier for an additional item, an additional order for pick-up;
determining a path from a location associated with the user account to a location of the additional supplier via a location of the supplier; and
sending the path to an in-car mapping device.

11. A non-transitory machine-readable medium having instructions embodied thereon, the instructions executable by a processor of a machine to perform operations comprising:
accessing history information for a user account, the history information including information for an item ordered by the user account;
presenting a first user interface that includes a selector for sensors;
receiving an input at the selector, the input being for a selection at the first user interface relating to the sensors;
presenting a second user interface that allows configuration of the sensors in response to receiving the input at the selector for the selection at the first user interface;
receiving a selection at the second user interface relating to the configuration of a first sensor of the sensors;
presenting a third user interface having a field to receive conditions for placing an order for the item;
receiving an input at the field of the third user interface corresponding to a condition for placing the order for the item;
configuring the first sensor based on the received configuration, the configuration relating to determining a duration of time;
electronically receiving first sensor data from the first sensor relating to the duration of time;
processing the first sensor data to determine if the duration of time exceeds a time threshold;
configuring a second sensor to detect an ambient temperature;
electronically receiving second sensor data from the second sensor relating to the ambient temperature;
processing the second sensor data to determine if a detected ambient temperature exceeds a temperature threshold;
determining an amount of the item used;
processing the first sensor data to determine a quantity of the item to be ordered, the quantity of the item to be ordered being determined based on the amount of the item used, the duration of time, the ambient temperature, and variable based on whether the duration of time exceeds the time threshold and whether the detected ambient temperature exceeds the temperature threshold; and
causing delivery of the item by a delivery date to a shipping address based on the duration of time exceeding the time threshold and the detected ambient temperature exceeding the temperature threshold.

12. The non-transitory machine-readable medium of claim 11, the operations further comprise:
determining preferences for the user account that include a first weight for a first preference of the user account for a first attribute pertaining to shipping and a second weight for a second preference of the user account for a second attribute for a plurality of suppliers;
determining a score for each supplier of the plurality of suppliers based on the first weight and the second weight; and
determining a supplier to provide the item for the user based on the score.

13. The non-transitory machine-readable medium of claim 12, the operations further comprise:
accessing data for the first attribute for a plurality of suppliers, each supplier of the plurality of suppliers being able to supply the item to be ordered; and
accessing data for the second attribute for the plurality of suppliers, wherein determining the score further includes determining the weights based on the data for the first attribute for the plurality of suppliers, and the data for the second attribute for the plurality of suppliers.

14. The non-transitory machine-readable medium of claim 11, the operations further comprise:
sending an order for the item to an electronic commerce server associated with a supplier, for pick-up;
sending, to a second electronic commerce server associated with an additional supplier for an additional item, an additional order for pick-up;
determining a path from a location associated with the user account to a location of the additional supplier via a location of the supplier; and
sending the path to an in-car mapping device.

* * * * *